United States Patent
Kumada et al.

(10) Patent No.: US 6,219,068 B1
(45) Date of Patent: *Apr. 17, 2001

(54) EDITOR AND EDITING METHOD IN CAD SYSTEM ENABLING EFFICIENT INTERACTIVE PATTERN DESIGN

(75) Inventors: Touru Kumada, Oyama; Eiichi Konno, Kawasaki; Isamu Maejima; Kazunori Kumagai, both of Oyama; Akihiko Suehiro, Kawasaki, all of (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,792

(22) Filed: Jan. 22, 1998

Related U.S. Application Data

(63) Continuation of application No. 08/373,788, filed on Jan. 17, 1995, now abandoned.

(30) Foreign Application Priority Data

Jun. 7, 1994 (JP) .................................... 6-125514

(51) Int. Cl.⁷ .................................................. G06T 11/20
(52) U.S. Cl. ........................... 345/441; 345/434; 345/435
(58) Field of Search .................................. 345/434, 435, 345/441

(56) References Cited

U.S. PATENT DOCUMENTS

| | | |
|---|---|---|
| 5,237,647 | 8/1993 | Roberts et al. . |
| 5,408,601 | 4/1995 | Nakamura et al. . |
| 5,418,712 | 5/1995 | Miwa et al. . |
| 5,428,744 | 6/1995 | Webb et al. . |
| 5,818,460 | * 10/1998 | Covey et al. ........................ 345/443 |

FOREIGN PATENT DOCUMENTS

| | | |
|---|---|---|
| 63-137451 | 6/1988 | (JP) . |
| 63-173117 | 7/1988 | (JP) . |
| 1-014628 | 1/1989 | (JP) . |
| 4-090056 | 3/1992 | (JP) . |

* cited by examiner

Primary Examiner—Mark Zimmerman
Assistant Examiner—Mano Padmanabhan
(74) Attorney, Agent, or Firm—Staas & Halsey, LLP

(57) ABSTRACT

An editor in a CAD system, which assigns different command functions to each of a plurality of buttons, enables commands for editing processing such as "movement", "deletion", and copying" to be issued by the corresponding buttons, and adds one polygon and another polygon by a first button or subtracts them from each other by a second button and, further, even when one of the commands of editing processing is being executed, makes it possible to perform a "change", "cancellation", "confirmation", etc. of the mode of processing by operation of the corresponding buttons, thereby enabling change of a once input parameter or initialization of once input information, whereby the efficiency of work in pattern design using a pointing device can be improved.

2 Claims, 36 Drawing Sheets

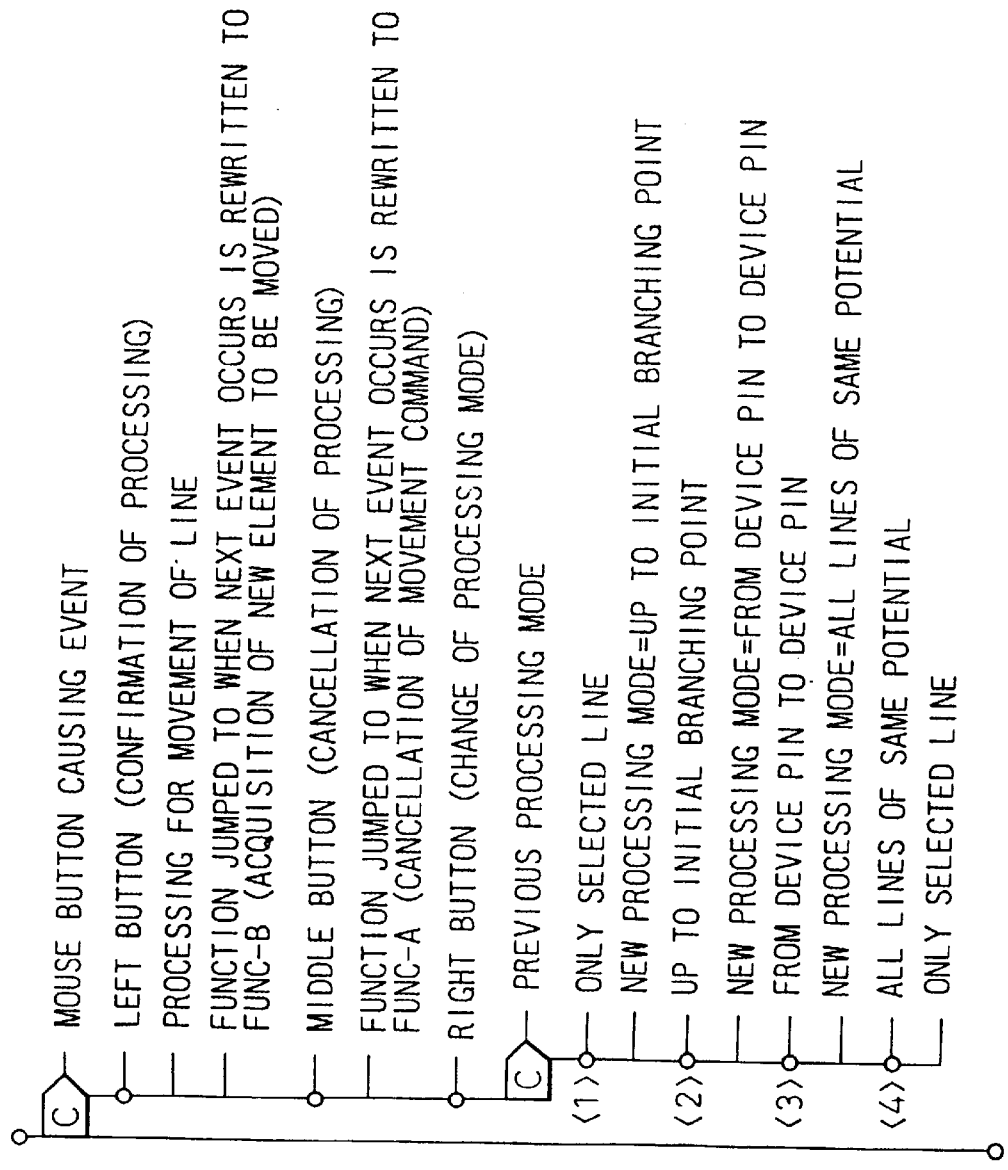

EDITOR AND EDITING METHOD IN CAD SYSTEM ENABLING EFFICIENT INTERACTIVE PATTERN DESIGN

This application is a continuation of application Ser. No. 08/373,788, filed Jan. 17, 1995, now abandoned.

BACKGROUND OF THE INVENTION

1. Field of the Invention

The present invention relates to a CAD system, in particular a pattern design editor for enabling interactive pattern design on a display from a workstation, and to an editing method of the same.

As an example of the work involved in pattern design, mention may be made of the disposition of a large number of electronic devices on a printed circuit board, the interconnection of these by conductors, and the formation of a graphic comprised of the conductors on the printed circuit board.

The functions of automatic configuration and automatic interconnection for designing patterns on a printed circuit board have been greatly automated and improved by the development of CAD systems. No matter how highly automated, however, complete automation of automatic configuration and automatic interconnection is difficult. Therefore, there are many areas in which human intervention for editing through an editor is necessary in a CAD system.

Accordingly, there has been a strong demand for increasing the efficiency of the manually performed editing work. The present invention relates to a CAD system answering this demand.

2. Description of the Related Art

In a general CAD system, there is a broad range of manually performed editing work in which greater efficiency is desired. The present invention takes note of the three types of work which form the basics of pattern design and which are closely related with each other.

The first is the work for designating the type of the editing processing, for example, "movement", "deletion", "copying", etc. of an element to be processed (a component, interconnection, land, etc.) and the work for designating the element to be processed.

The second is the work for editing the above element, in particular, an element having a complicated shape. For example, in pattern design on a printed circuit board, reduction of noise requires the formation of earth conductors of as large an area as possible while avoiding short circuits with other elements (lands, interconnections, pins, vias, etc.)

The third is the work for changing a once input parameter (data specifically defining element) due to some reason or another in the middle of the first or second type of work and the work for initializing and canceling information previously input due to some reason or another in the middle of the work.

The above first to third types of work had been performed as follows in the prior art.

First, the work for designating the type of the editing processing had been performed as follows in the related art. When the editing processing (for example, movement, deletion, copying, etc.) was to be performed on the display of the CAD system, the designer first called up on the display a menu showing the different types of editing processing, then operated a button of a pointing device, for example, a mouse, to instruct the type of editing processing desired.

After instructing the type of the editing processing (for example, movement), the designer used the mouse to move the cursor and select the element (for example, electronic device) on the display to be moved.

After this, the designer used the cursor to specify the position to be moved to.

Next, the work for editing an element having a complicated shape had been performed as follows in the related art.

Taking as an example the above earth conductor, a conductor is a N-gonal (N being an integer of 3 or more) broad area conductor. The designer used a pointing device, for example, a mouse, to select the N number of salient points of the N-gon on the display of the CAD system so as to input the coordinates of the salient points. Next, the designer edited the broad area N-gonal conductor pattern having the input coordinates as its salient points.

Next, the work for changing a once input parameter in the middle of the pattern design and the work for canceling (initializing) the already input information in the middle of a design had been performed as follows in the related art.

For example, assume that during execution of a command for input of a certain element, the parameters of that element are designated once by the editor. Alternatively, assume that the coordinate data and other information have already been input in the editor.

Assume further that for some reason or another, there is a request for changing a parameter or a request for initializing (canceling) the input information.

In such a case, since the parameter or the information were input during a certain command, when the designer wanted to change the parameter or initialize the input information in the middle of the design, he had to first end the execution of the command or else was not able to change the parameter or initialize the input information.

There were, however, the following problems in the related art.

When performing the above editing processing (for example, movement, copying, etc.), the designer had to always execute two operations, that is, selection of the type of editing processing from the menu and selection of the element to be subjected to the editing processing on the display. These two operations had to be performed very frequently. Therefore, the work involved in this editing became greater and the efficiency of pattern design became poorer.

Further, the "N" in the broad area N-gonal conductor generally may be as large as several thousands. Erroneous input was easy and correction of erroneous inputs was difficult. For these reasons, the efficiency of pattern design was further reduced.

Sometimes a function of inputting in the form of rectangles is provided as a method of instruction, but when switching from the usual input by salient points to input by rectangles, it is necessary to end the execution of the editing command once, so there is still the problem of reduction of the efficiency of pattern design.

Further, when instructing by input of rectangles, there is the disadvantage that it is not possible to instruct by input of a rectangle having a side in a direction intersecting the horizontal and vertical directions, that is, an inclined side.

When changing a parameter or initializing input information, further, it was necessary to end the execution of the command by which the parameter or input information had been input, so the designer had to perform further operations and again the efficiency of the pattern design was reduced.

SUMMARY OF THE INVENTION

The present invention was made in consideration of the above problems and has as its first object the improvement of the efficiency of work in pattern design by simplification of the operation for selecting the type of the editing processing and the operation for selecting the element to be subjected to the editing processing.

The present invention has as a second object the improvement of the efficiency of work in pattern design by enabling easy specification of the shape of a graphic by a simple operation when editing a graphic comprised of a broad area N-gon.

The present invention has as a third object the improvement of the efficiency of work in pattern design by enabling changes of a once input parameter and initialization of once input information without an operation for ending the execution of the current command.

To attain the above objects, the present invention assigns different command functions to each of a plurality of buttons, enables commands for editing processing such as "movement", "deletion", and copying" to be issued by the corresponding buttons, and adds one polygon and another polygon by a first button or subtracts them from each other by a second button. Further, even when: one of the commands of editing processing is being executed, it is possible to perform a "change", "cancellation", "confirmation", etc. of the mode of processing by operation of the corresponding buttons, thereby enabling change of a once input parameter or initialization of once input information.

BRIEF DESCRIPTION OF THE DRAWINGS

The above objects and features of the present invention will be more apparent from the following description of the preferred embodiments with reference to the accompanying drawings, wherein:

FIG. 37 is a view showing an example of the flow of processing of the function C in FIG. 36.

DESCRIPTION OF THE PREFERRED EMBODIMENTS

Embodiments of the present invention will be described next with reference to the related figures.

Figure 1:
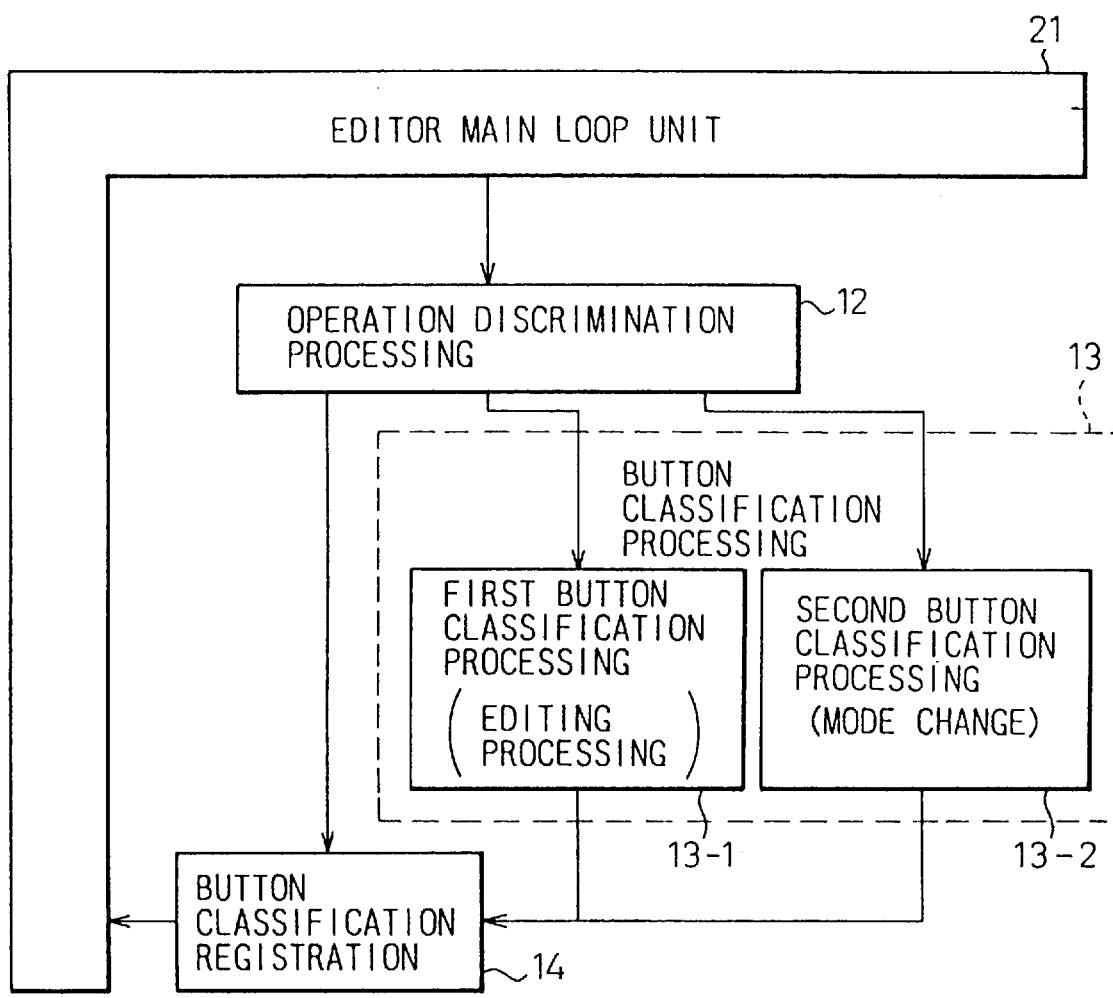
FIG. 1 is a schematic view of the configuration of an editor related to the first object of the present invention.

FIG. 1 is a schematic view of the configuration of an editor related to the first object of the present invention.

According to a first embodiment of the present invention (FIG. 1), there is provided an editor in a CAD system wherein a pointing device provided with a plurality of pointing buttons is used to operate a cursor on a display for pattern design, provided with an editor main loop unit 11 for governing the overall management of the various types of events which occur during editing, an operation discrimination processing means 12 for receiving a notification of button operation from the editor main loop unit 11 when one of the plurality of buttons is operated so as to recognize which button among the plurality of buttons has been operated and recognizing the designation of the cursor at that time, and a button classification processing means 13 for selecting the processing specific to the button, predetermined for each of the plurality of buttons, in accordance with the results of recognition by the operation discrimination processing means 12, and executing the selected processing.

That is, in the first embodiment, the command control are performed by the buttons of a pointing device, for example, a mouse.

According to a second embodiment of the present invention (FIG. 1), the button classification processing means 13 is comprised of at least a first button classification processing unit 13-1 and a second button classification processing unit 13-2, which are alternately selected in accordance with the results of recognition by the operation discrimination processing means 12, and the processing specific to the buttons, predetermined for each of the plurality of buttons, when the first button classification processing unit 13-1 is selected and the processing specific to the buttons, predetermined for each of the plurality of buttons, when the second button classification processing unit 13-2 is selected differ from each other.

That is, in the second embodiment, the plurality of buttons are assigned different command controls.

According to a third embodiment of the present invention, the first button classification processing unit 13-1 is selected when processing is performed for editing a pattern in pattern design and the second button classification processing unit 13-2 is selected when changing the mode of processing on the pattern during execution of processing for editing a pattern.

That is, in the third embodiment, command control for processing for editing a pattern and command control for changing the mode of processing are assigned to the buttons.

According to a fourth embodiment of the present invention, the processing specific to the buttons predetermined for three buttons are "movement of pattern", "deletion of pattern", and "copying of pattern" when the first button classification processing unit 13-1 is selected.

That is, in the fourth embodiment, the operations of pattern movement, deletion, and copying are assigned to the buttons.

According to a fifth embodiment of the present invention, the processing specific to the buttons predetermined for three buttons are "change of mode of processing", "cancellation of mode of processing", and "confirmation of mode of processing" when the second button classification processing unit 13-2 is selected.

That is, in the fifth embodiment, operations of changing, canceling, and confirming the mode of processing are assigned to the buttons.

According to a sixth embodiment of the present invention, in the operation of the button corresponding to "change of mode of processing", the range of application of the processing for editing the pattern is changed in a cycle each time the button is operated.

That is, in the sixth embodiment, it is possible for example to rotate the direction of disposition of a device to 90°→180°→270°→ and so on each time a button is depressed.

According to a seventh embodiment of the present invention, when the cursor is moved while depressing a particular button, a rectangle having the path of movement as a diagonal is shown on the display. The length of the path of movement is used for designating collective elements of a pattern or a single element of a pattern.

That is, in the seventh embodiment, an element to be designated may be specified by defining a rectangle having the path of movement of the cursor as its diagonal and by the size of the portion enclosed by the rectangle.

According to an eighth embodiment of the present invention, the button classification processing means 13 stores the type of the specific processing last executed and when the button classification processing means 13 is next activated, starts the processing from the stored specific processing.

That is, in the eighth embodiment, the type of the processing when the processing is last ended, that is, the last mode, is stored and the next processing is started from this last mode. This takes note of the fact that when performing various operations in pattern design, the operations are generally performed in sequence.

According to a ninth embodiment of the present invention, provision is made of a button classification registering means 14 for registering the type of the processing of the button classification processing means 13 in the editor main loop unit 11.

That is, in the ninth embodiment, provision is made of a means for registering the definitions of the command control of the different buttons in the editor.

According to a 10th embodiment of the present invention, each of the plurality of buttons is given a different command function and editing commands are issued by depression of the buttons for execution of the editing for pattern design.

That is, in the 10th embodiment, provision is made of a method of editing enabling pattern design just by operating buttons, i.e., without use of a menu.

Figure 2:
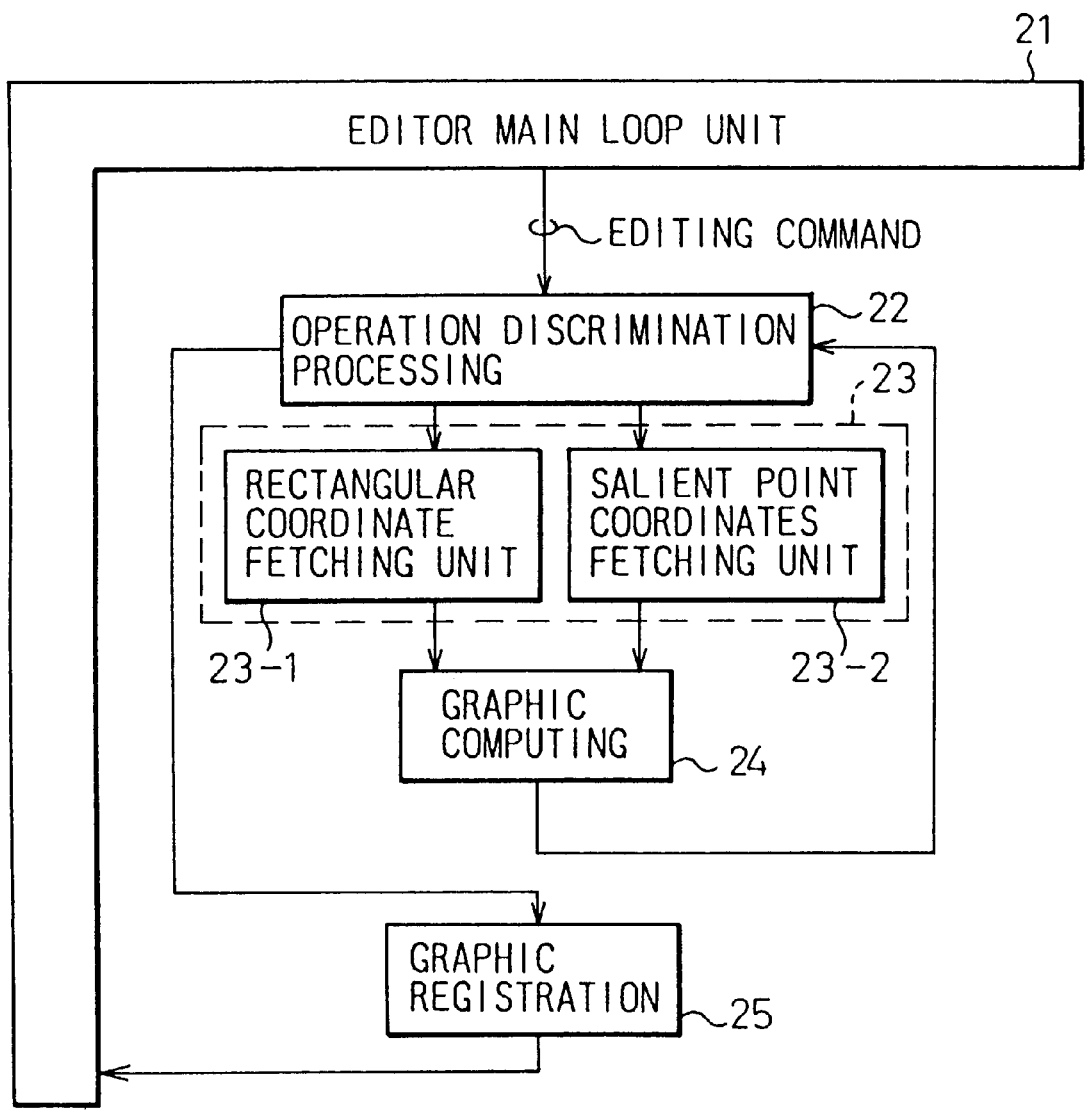
FIG. 2 is a schematic view of the configuration of an editor related to the second object of the present invention.

FIG. 2 is a schematic view of the configuration of an editor related to the second object of the present invention.

According to the 11th embodiment of the present invention (FIG. 2), the editor is provided with an editor main loop unit 21 for governing the overall management of the various types of events which occur during editing, an operation discrimination processing means 22 for, when receiving from the editor main loop unit 21 a command instructing the editing of an N-gonal (N being an integer of 3 or more) graphic on a display, recognizing which button among the plurality of buttons has been operated, recognizing the designation of the cursor at that time, and discriminating whether processing for adding a graphic or processing for subtracting a graphic should be performed in accordance with the type of the button operated, a coordinate fetching means 23 for fetching the: coordinates of the N-gonal graphic to be edited and specifying the overall shape of the graphic based on the designation of the cursor, a graphic computing means 24 for receiving an instruction as to whether to perform addition processing or subtraction processing, given from the operation discrimination processing means 22, and the information on the graphic specifying its shape from the coordinate fetching means 23 and adding or subtracting the specified graphic with respect to a graphic already produced on the display, and a graphic registering means for registering the graphic confirmed by the graphic computing means 24 in a memory area of the editor main loop unit 21.

That is, in the 11th embodiment, a new N-gonal graphic is created by adding to an existing N-gonal graphic another N-gonal graphic or by subtracting from it another N-gonal graphic.

According to a 12th embodiment of the present invention (FIG. 2), the coordinate fetching means 23 is comprised of a rectangular coordinate fetching unit 23-1 for receiving as input the starting point and end point of the path of movement of the cursor as information on the diagonal and specifies a graphic as a rectangle including that diagonal and a salient point coordinate fetching means 23-2 for specifying a graphic by the group of salient point coordinates input for the salient points by the cursor.

That is, in the 12th embodiment, the other N-gonal graphic is defined on the display either by designation of a rectangle (when N=4) having the path of movement of the cursor as a diagonal or by designation of the coordinates of the salient points of the graphic.

According to a 13th embodiment of the present invention, a new N-gonal graphic is edited by superposing an N-gonal graphic edited by cursor operation on an N-gonal graphic formed on the display.

That is, in the 13th embodiment, provision is made of a method for producing a new graphic by superposition, that is, addition of a graphic to or subtraction of one from an already existing N-gonal graphic.

According to a 14th embodiment of the present invention, a new N-gonal graphic is edited by combining by addition an N-gonal graphic edited by cursor operation using a first button among the plurality of pointing buttons to an N-gonal graphic formed on the display and a new N-gonal graphic is edited by combining by subtraction an N-gonal graphic edited by cursor operation using a second button among the plurality of pointing buttons from an N-gonal graphic formed on the display.

That is, in the 14th embodiment, for the 13th embodiment, a graphic is added when superposing a graphic on an original graphic by a first button and a graphic is subtracted when superposing it by a second button.

Figure 3:
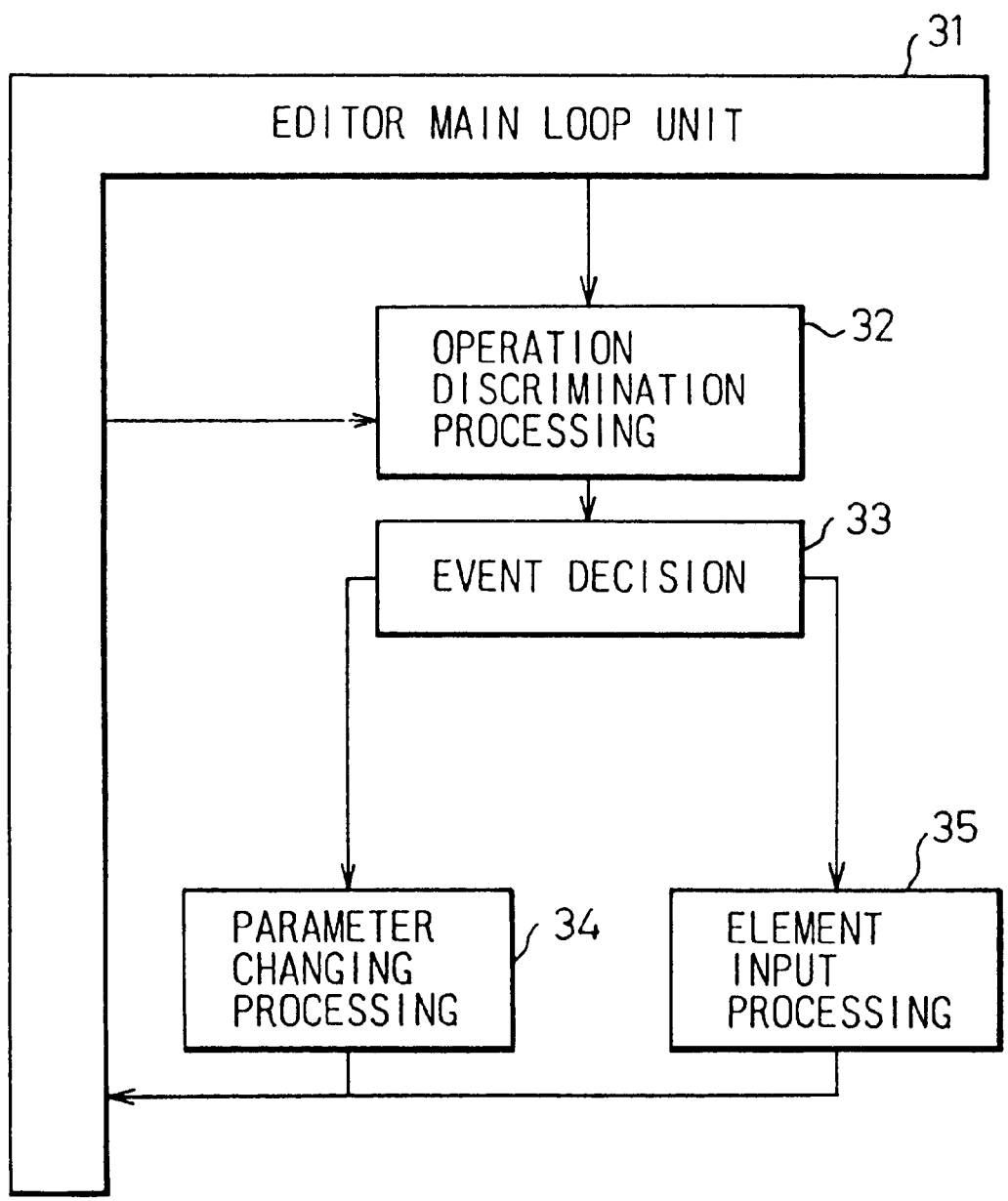
FIG. 3 is a schematic view of the configuration of a first editor related to the third object of the present invention.

FIG. 3 is a schematic view of the configuration of a first editor related to the third object of the present invention.

According to the 15th embodiment of the present invention (FIG. 3), a first editor is provided with an editor main loop unit 31 for governing the overall management of the various types of events which occur during editing, an operation discrimination processing means 32 for receiving from the editor main loop unit 31 a notification of a button operation when one of the plurality of buttons is operated, recognizing which button among the plurality of buttons has been operated, and recognizing the designation of the cursor at that time, an event decision means 33 for receiving a command for inputting an element for constructing the pattern from the editor main loop unit 31 and for deciding whether a request for changing a parameter specifically defining an element has been issued from the operation discrimination processing means 32, a parameter changing processing means 34 for, when it is decided by the event decision processing means 32 that a request for changing a parameter has been issued, executing processing to change the parameter and, after execution, transferring control to the editor main loop unit 31, and an element input processing means 35 for executing processing for inputting an element for each event when it is decided by the event decision means 33 that there is no event by which a request is made to change a parameter and, after the execution of the processing for input, transfers the control to the editor main loop unit 31.

That is, in the 15th embodiment, when there is a request for changing an already input parameter in the middle of production of a pattern, it is possible to make the change corresponding to that request without ending the execution of the current command.

According to a 16th embodiment of the present invention, when it is decided by the event decision means 33 that the cursor is pointing to an element input menu on the display, a first parameter changing processing means 51 is activated.

That is, in the 16th embodiment, provision is made of a first parameter changing processing means for dealing with requests for changing parameters occurring on the menu.

According to a 17th embodiment of the present invention, when it is decided by the event decision means 33 that the cursor is pointing to an editor screen on the display and a first button among the plurality of pointing buttons has been operated, a second parameter changing processing means 52 is activated.

That is, in the 17th embodiment, provision is made of a second parameter changing means for dealing with cases where a button assigned for use in changing parameters has been operated.

According to an 18th embodiment of the present invention, provision is made of a parameter fetching means 53 for fetching an element input parameter in an element input menu when it is decided by the event decision means 33 that the cursor is pointing to an editor screen on the display and a second button among the plurality of pointing buttons has been operated.

That is, in the 18th embodiment, corresponding to the 16th embodiment, the parameter desired to be changed is fetched from the menu by a button different from the button in the 17th embodiment.

According to a 19th embodiment of the present invention, the parameter fetching means 53 is located in front of the element input processing means 35.

That is, in the 19th embodiment, the parameter fetching means of the 18th embodiment is positioned in front of the element input processing means 35 of FIG. 3.

Figure 4:
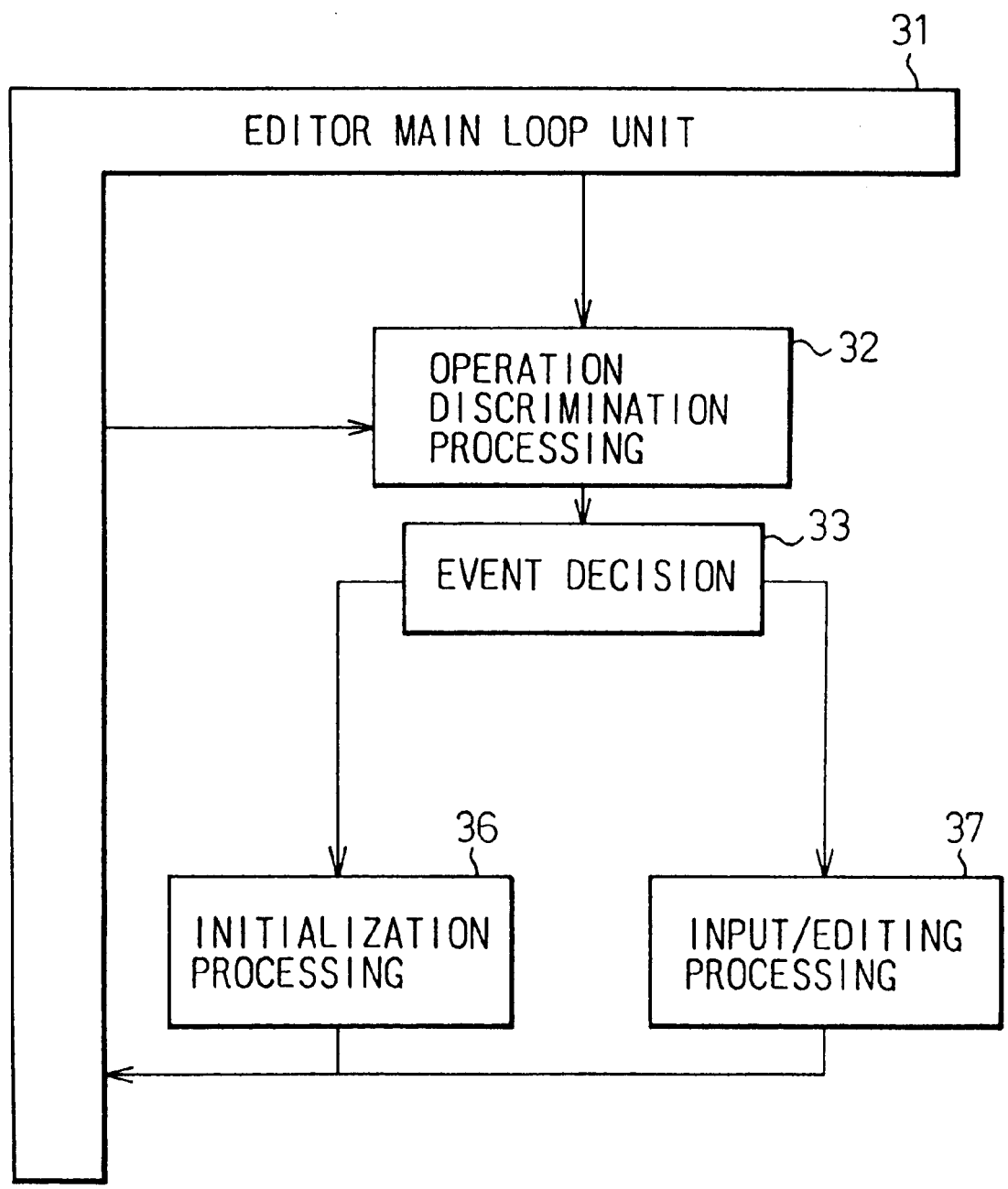
FIG. 4 is a schematic view of the configuration of a second editor related to the third object of the present invention.

FIG. 4 is a schematic view of the configuration of a second editor related to the third object of the present invention.

According to the 20th embodiment of the present invention (FIG. 4), a second editor is provided with an editor main loop unit 31 for governing the overall management of the various types of events which occur during editing, an operation discrimination processing means 32 for receiving from the editor main loop unit 31 a notification of a button operation when one of the plurality of buttons is operated, recognizing which button among the plurality of buttons has been operated, and recognizing the designation of the cursor at that time, an event decision means 33 for receiving a command for inputting an element for constructing the pattern from the editor main loop unit 31 and for deciding whether a request for initializing already input information has been issued from the operation discrimination processing means 32, an initialization processing means 36 for executing processing for initializing already input information when it is decided by the event decision processing means 32 that a request for initialization has been issued and, after execution, transferring control to the editor main loop unit 31, and an input/editing processing means 37 for executing processing for inputting new data for each event or processing for newly instructed editing when it is decided by the event decision means 33 that there is no event by which a request for initialization is made and, after the execution of the processing for input, transfers the control to the editor main loop unit 31.

That is, in the 20th embodiment, when there is a request for initialization of already input information in the middle of production of a pattern, it is made possible to perform an initialization operation to deal with that request without ending the execution of the current command.

According to a 21st embodiment of the present invention, the initialization processing means 36 is activated when there is data to be initialized and the input/editing processing means 37 is activated when there is no data to be initialized.

That is, in the 21st embodiment, whether or not to activate the initialization processing means is determined by whether or not there is data to be initialized.

According to a 22nd embodiment of the present invention, when there is a request for changing a parameter specifically defining an element during the execution of an input command for input of an element forming a pattern, the parameter is changed without ending the execution of the input command.

That is, in the 22nd embodiment, for the 15th embodiment, provision is made of a method of editing for changing a parameter without ending the execution of the input command.

According to a 23rd embodiment of the present invention, when there is a request for initialization of already input information during the execution of an event, the already input information is initialized without ending the execution of the current command.

That is, in the 23rd embodiment, for the 20th embodiment, provision is made of a method of editing for initializing already input information without ending the execution of the input command.

Figure 5:
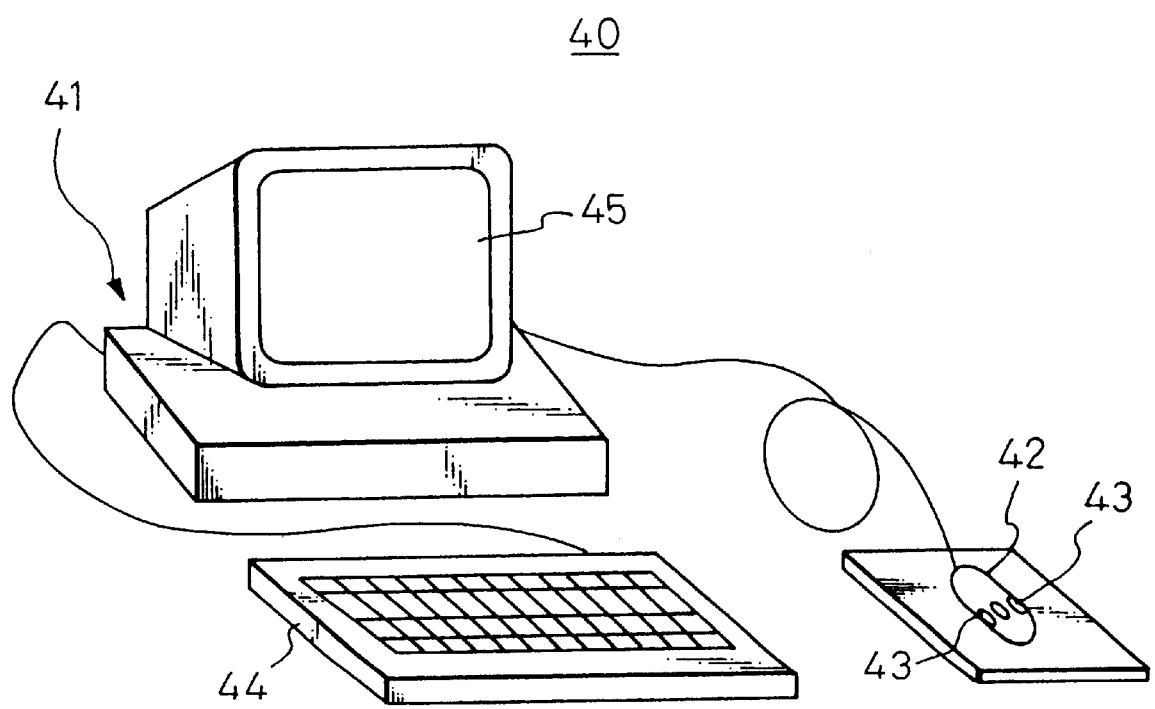
FIG. 5 is a view of an example of the configuration of a CAD system to which the present invention is applied.

FIG. 5 is a view of an example of the configuration of a CAD system to which the present invention is applied. Reference numeral 40 in the figure shows the CAD system as a whole. The main components are a workstation 41, a pointing device (mouse) 42 having a plurality of buttons 43, and a keyboard 44.

The workstation 41 is comprised of a central processing unit (CPU) and various memories storing processing programs and data. These constitute the editor according to the present invention. Note that 45 is a display on which the screen for editing a design is shown.

Figure 6:
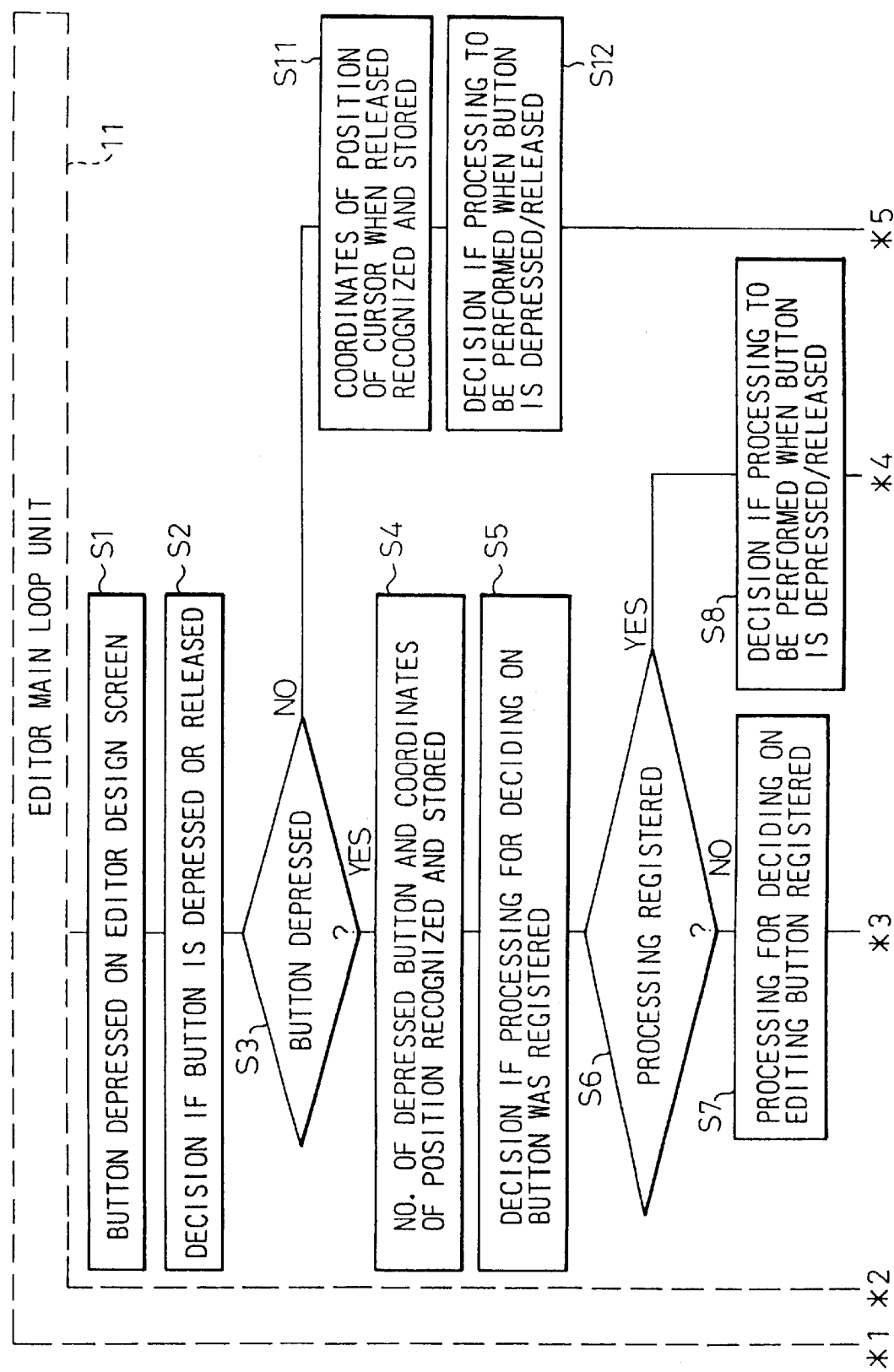
FIG. 6 is a flow chart (part 1) showing the flow of processing executed under the configuration shown in FIG. 1.
Figure 7:
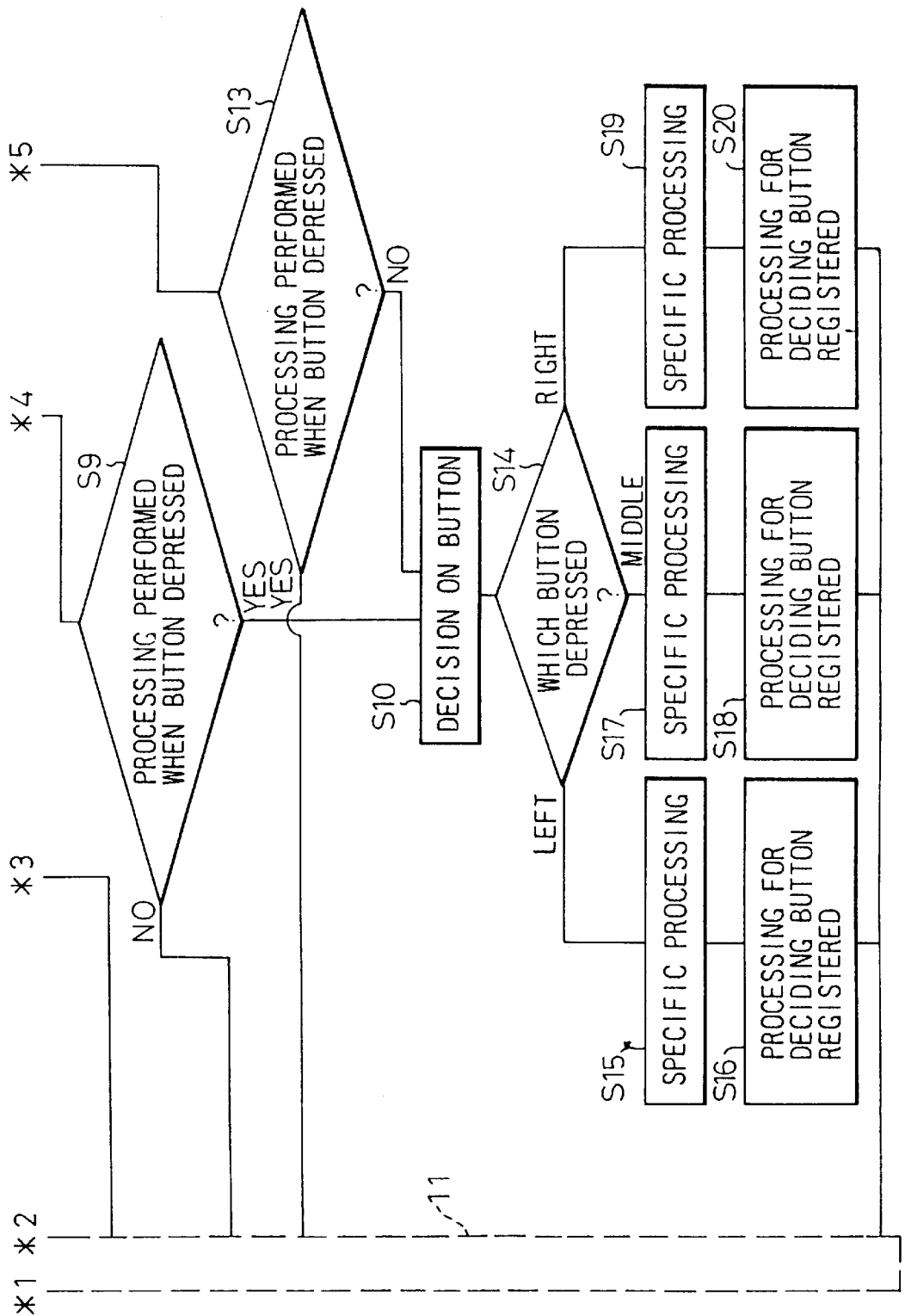
FIG. 7 is a flow chart (part 2) showing the flow of processing executed under the configuration shown in FIG. 1.

FIG. 6 and FIG. 7 are flow charts showing the flow of processing executed under the configuration shown in FIG. 1. In the figures, the editor main loop unit 11 of FIG. 1, which performs the general management of the events of the editor (mouse button operation, keyboard input, etc.), that is, the recognition of the operations of real time events, is shown by the dotted line. In FIG. 6 and FIG. 7, the characterizing parts of the processing in FIG. 1 are shown by the steps S14, S15, . . . S20.

At step S14, it is judged which of the buttons among the plurality of buttons 43 provided on the mouse 42 has been pushed. Note that in this embodiment, the mouse is one which has three buttons (left, middle, and right) 43.

Assuming that the left button has been depressed, a particular processing, for example, movement of the pattern (element), is designated (step S15) and processing for judging the function assigned to the button is performed at the editor main loop unit 11 (step S16).

A similar operation is performed as the step S17 and step S18 when the middle button has been depressed and is: performed as the step S19 and step S20 when the right button has been depressed. As an example, when the middle button has been depressed, deletion of the pattern (element) is designated, while when the right button has been depressed, copying of the pattern (element) is designated.

When a button is depressed (step S1), a signal to the effect that an event has occurred is supplied from the editor main loop unit 11 to the operation discrimination processing means 12 of FIG. 1. Here, it is recognized which button 43 has been depressed and the cursor designation (coordinates of position of cursor) is recognized (step S4).

At this time, if the processing for deciding the function assigned to the button has not yet been registered, this is registered at the editor main loop unit 11 (steps S5, S6, and S7). That is, the button classification processing means 13 of FIG. 1 is registered in the editor main loop unit 11 by the button classification registration means 14 of FIG. 1. After this, the processing is transferred to the editor main loop unit 11.

If the result at step S6 is YES, it is decided if the processing is to be performed at the time when the button 43 is depressed or released. If to be performed when depressed, the routine proceeds to step S10 (step S8 and step S9).

If the result at step S3 is NO, that is, when the button 43 has been released, the coordinates of the position of the cursor at that time are recognized and stored at step S11.

At step S12, the same type of decision is performed as in step S8. If the processing is to be performed when the button is released (NO at step S13), the routine proceeds to step S10.

At step S10 and step S14, a decision is made as to the depressed button. This is followed by the above-mentioned steps S15 to S20.

Figure 8:
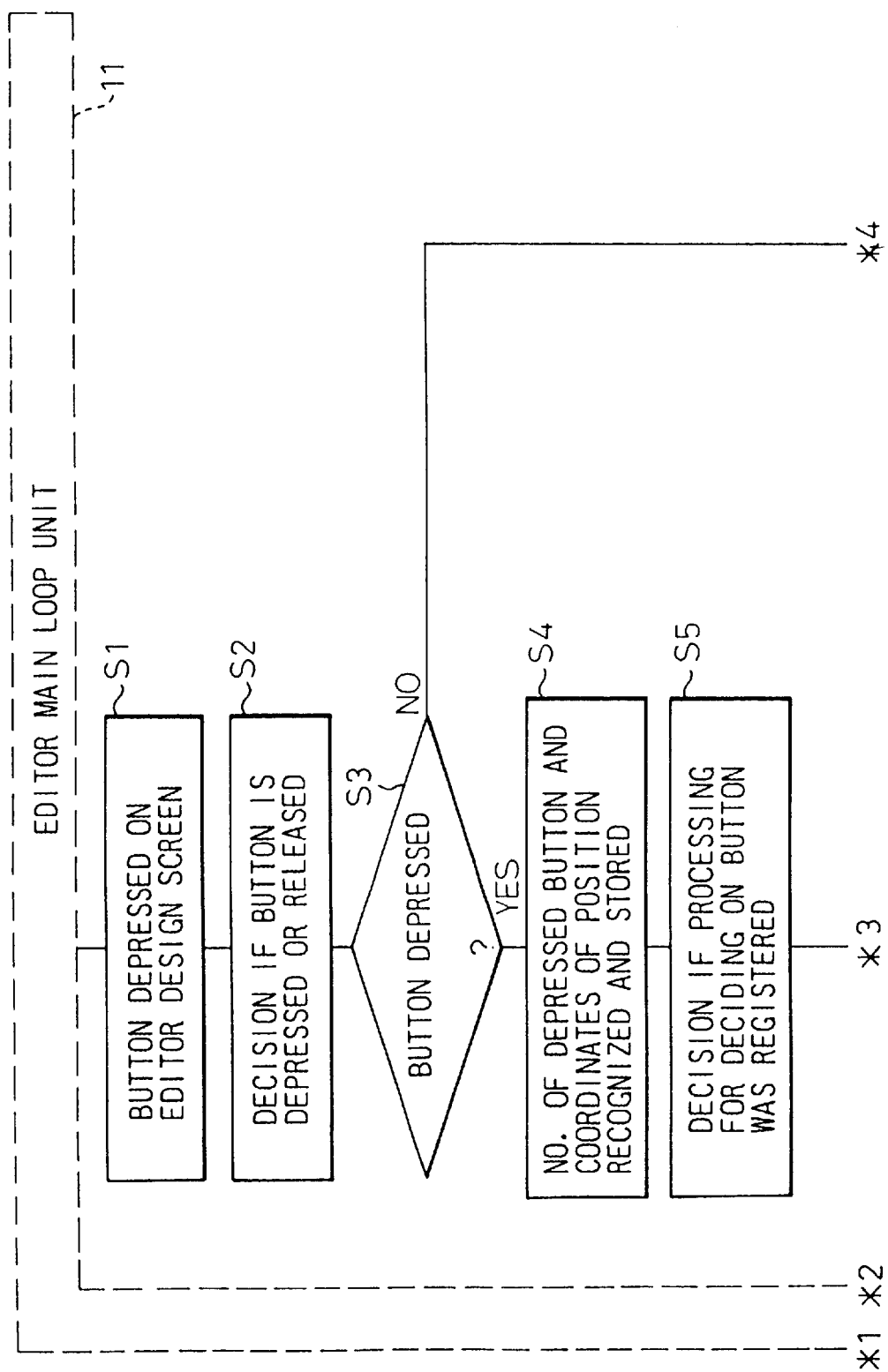
FIG. 8 is a flow chart (part 1) showing a specific example of the processing executed under the configuration shown in FIG. 1.
Figure 9:
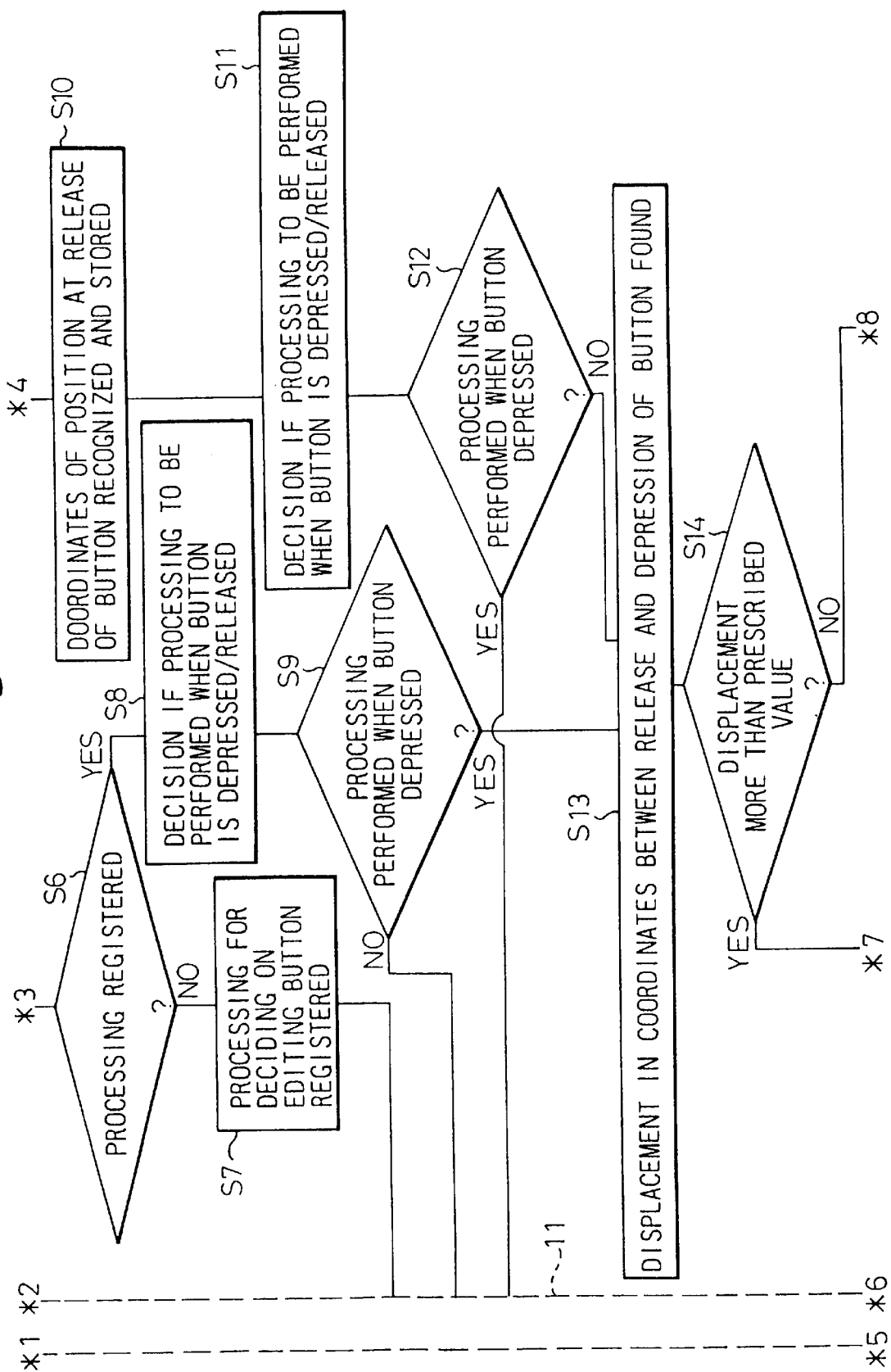
FIG. 9 is a flow chart (part 2) showing a specific example of the processing executed under the configuration shown in FIG. 1.
Figure 10:
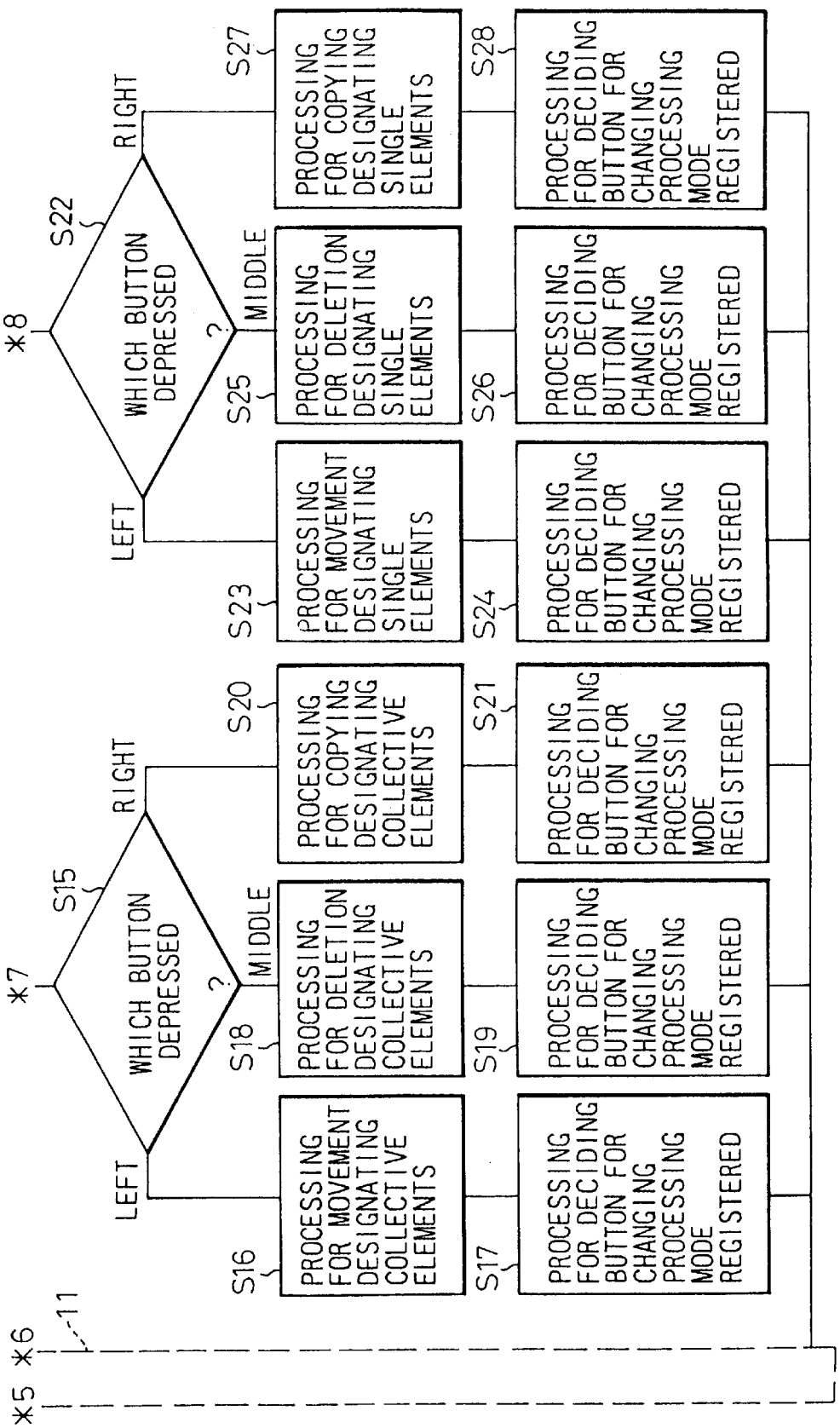
FIG. 10 is a flow chart (part 3) showing a specific example of the processing executed under the configuration shown in FIG. 1.

FIG. 8 to FIG. 10 are flow charts showing a specific example of the processing executed under the configuration shown in FIG. 1.

When the designer releases a button 43 of the mouse 42 on the editor design screen (step S1), this is detected by the system, the steps S4, S5, S6, S7, S8, and S9 of the case where the button is depressed (same as steps S4, S5, S6, S7, S8, and S9 in FIGS. 6 and 7) are invalidated, and the processing proceeds to step S10 in FIG. 9 and then through steps S11 and S12 (same as steps S12 and S13 in FIGS. 6 and 7) and reaches step S13.

At steps S13 and S14, when the cursor is moved on the display (editor design screen), a rectangle having that path of movement as a diagonal is displayed. The length of that path of movement (that is, the displacement from starting point to end point of cursor) is used to determine if collective elements of a pattern or a single element have been designated.

That is, if the displacement is more than a prescribed value at step S14 (YES), it is decided that collective elements, such as an electronic component, have been designated, while if the displacement is less than the prescribed value (NO), it is decided that a single line, single pin, or other single element has been designated.

The processing started at step S15 in FIG. 10 is for the case of designation of collective elements. The processing starting at step S22 in FIG. 10 is for the case of designation of a single element.

At steps S15 and S22, it is decided which button (left, middle, or right) of the mouse 42 has been depressed. Processing for example for "movement", "deletion", or "copying" is executed on the designated element in accordance with which of the left button, middle button, and right button was depressed.

Steps S16, S18, S20, S23, S25, and S27 of FIG. 10 constitute the processing performed by the first button classification processing unit 13-1 of FIG. 1. If one of the left button, middle button, and right button of the mouse 42 is depressed again during this processing, the processing of "movement", "deletion", or "copying" is not repeated. The processing at this time is transferred to the second button classification processing unit 13-2, where for example the left button is defined as being for "confirmation of the mode of processing", the middle button for "cancellation of mode of processing", and the right button for "change of mode of processing". For example, when the processing for "movement" is ended and the left button is again depressed, the movement command is released and the next command is awaited.

On the other hand, if the above right button is depressed during the above "movement" processing, the mode of processing is changed. This is possible during processing for "deletion" and during processing for "copying" as well. A specific example of this will be explained with reference to FIG. 13 and FIG. 14, but the process for registering the change in the mode of processing in the editor main loop unit 11 is shown in S17, S19, S21, S26, and S28 at the bottom of FIG. 10

Each time the right button corresponding to "change of mode of processing" is depressed, the range of application of the editing processing is changed in a cycle. For example, taking as an example the processing of "deletion", if the cursor used to moved to the line to be deleted and the right button is depressed once, the one line segment in contact with the cursor is highlighted. If the left button is then depressed, this is deleted. If the right button is depressed again, the previous line segment stretching to that line segment is highlighted. If the left button is depressed, this previous line segment is then deleted. If the right button is depressed once again, all the lines with the same potential as that line segment are highlighted and if the left button is then depressed, all those lines are deleted. If the right button is again depressed, the original screen is returned to. That is, the range of deletion is changed by the depression of the right button. Deletion first occurs when depressing the left button of the mouse when that range is highlighted.

Further, taking the example of "movement", the mode of processing is changed to one where if the right button is depressed once, the graphic is rotated 90° and if it is depressed again, it is rotated a further 90° (180° in total).

Figure 11:
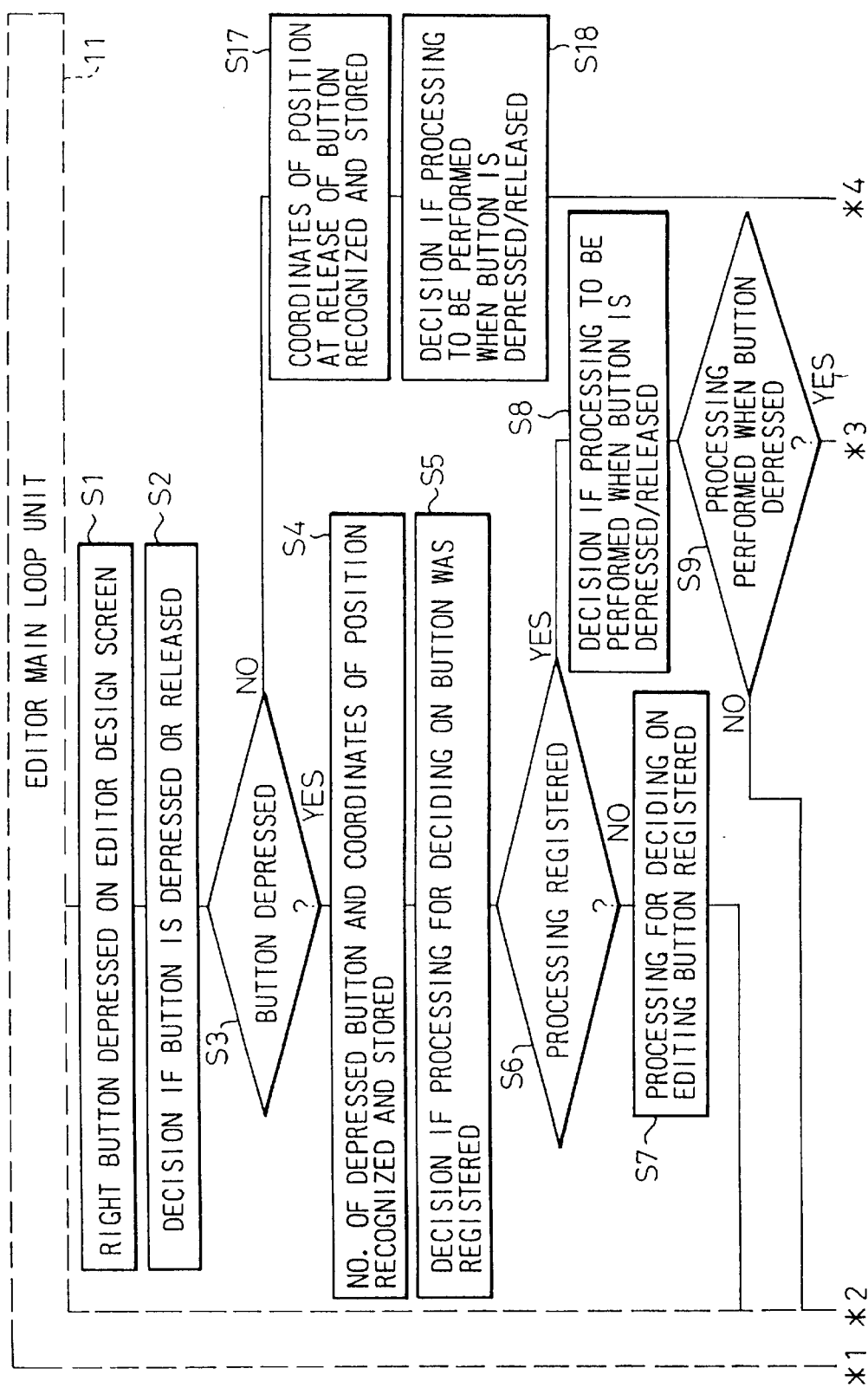
FIG. 11 is a flow chart (part 1) showing an example of the processing according to a second button classification processing means (for changing modes) shown in FIG. 1.
Figure 12:
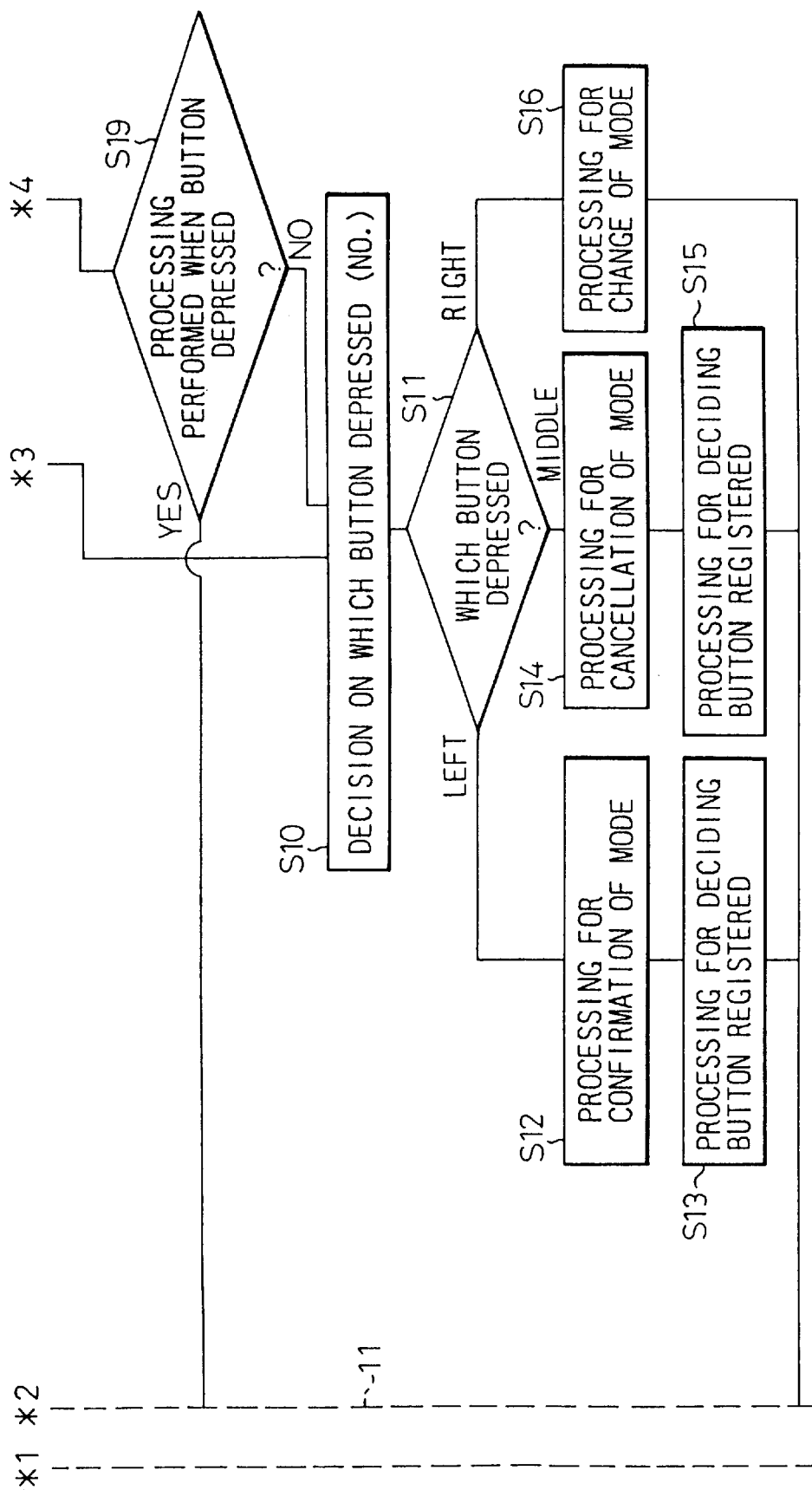
FIG. 12 is a flow chart (part 2) showing an example of the processing according to a second button classification processing means (for changing modes) shown in FIG. 1.

FIG. 11 and FIG. 12 are flow charts showing an example of the processing according to a second button classification processing means (for changing modes) shown in FIG. 1.

At step S1, if the designer depresses the right button of the mouse 42, the routine proceeds through step S2 and S3 to reach step S4, where the number of the button which has been depressed (left, middle, or right) and the cursor designation at that time (coordinate position) are recognized and stored.

If it is decided that the processing for deciding on the button has not been registered, the routine proceeds through step S5 and S6 (NO) and that processing is registered (registration at second button classification processing unit 13-2).

If it has been registered, the routine proceeds through step S8 and step S9 (YES) to step S10. Note that steps S17, S18, and S19 after it is decided that the button has been released at step S3 (NO) are suspended.

When it is decided at step S10 and step S11 that the right button of the mouse has been depressed, the above-mentioned "change of mode of processing" is executed. Note that in the setting in the figures, the right button has been depressed, so steps S12 and S13 and steps S14 and S15 are suspended.

Figure 13:
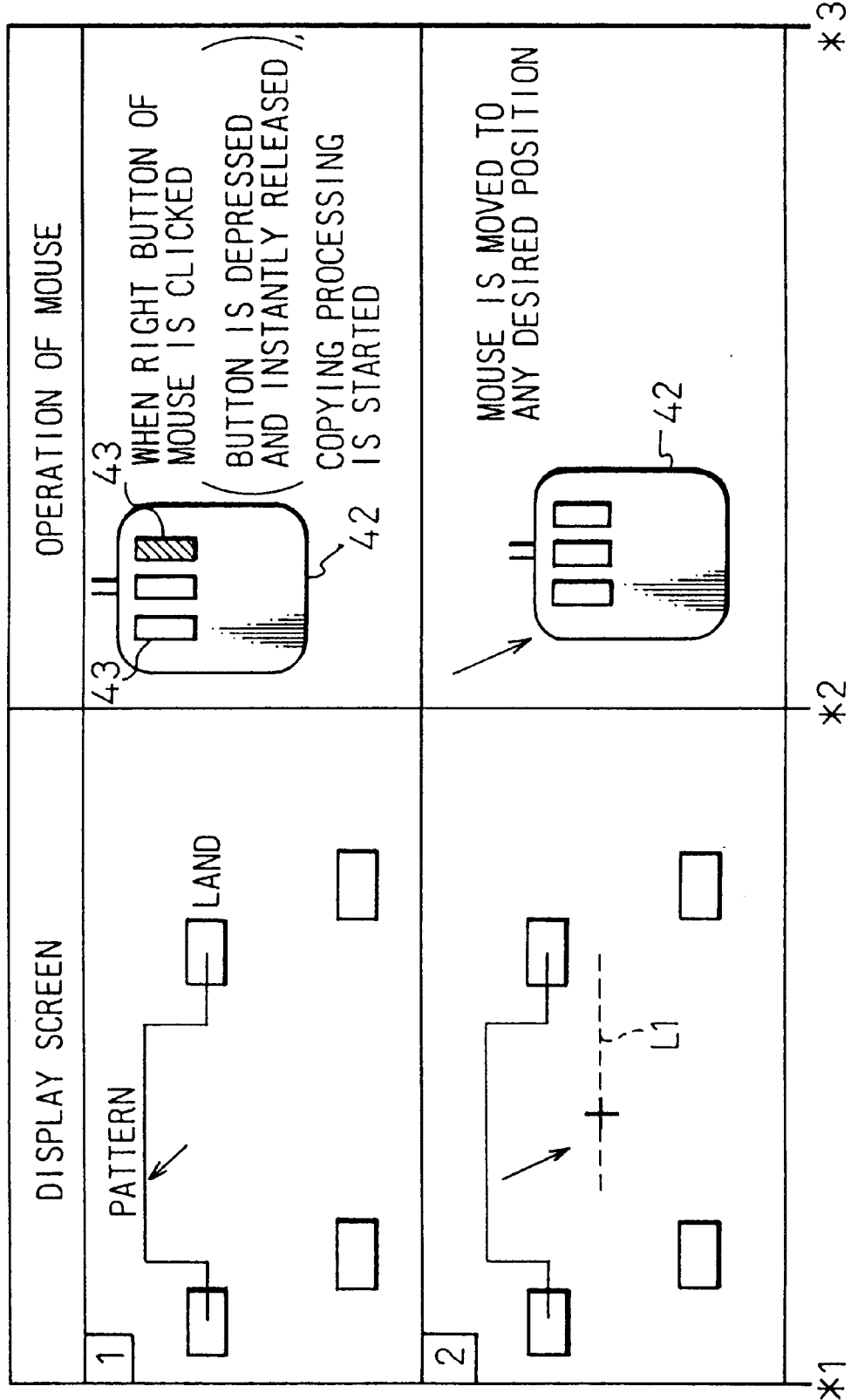
FIG. 13 is a view (part 1) schematically showing an example of pattern editing by the configuration of FIG. 1.
Figure 14:
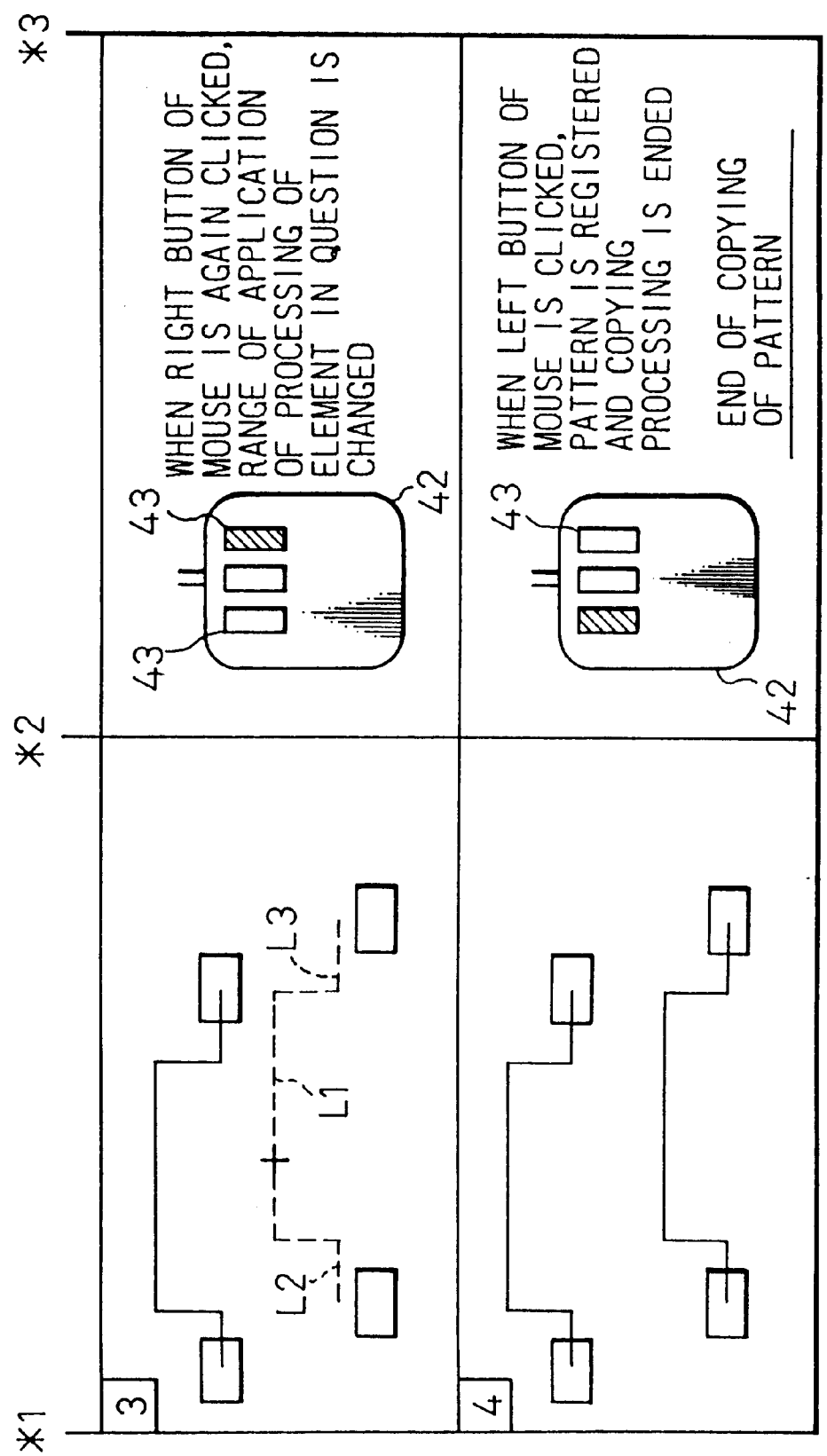
FIG. 14 is a view (part 2) schematically showing an example of pattern editing by the configuration of FIG. 1.

FIG. 13 and FIG. 14 are views schematically showing an example of pattern editing by the configuration of FIG. 1.

At step 1 in FIG. 13, the editing designated by the right button, for example, "copying", is performed by the first button classification processing unit 13-1. What is copied is the line pointed to by the cursor.

At step 2 in FIG. 13, the mouse 42 is moved in the direction of the arrow in the figure. This is for copying the line.

Here, however, as shown in step 3 of FIG. 14, if the right button is depressed, the processing of FIG. 1 is transferred to the second button classification processing unit 13-2 and an operation is performed for changing the mode of processing designated by the right button. This being done, the line L1 copied at step 2 is extended to the line L2 and L3 by the depression of the right button.

At step 4 of FIG. 14, if the left button of the mouse is depressed, the operation of copying of the pattern is completed based on the "confirmation of processing mode" assigned to the left button.

Figure 15:
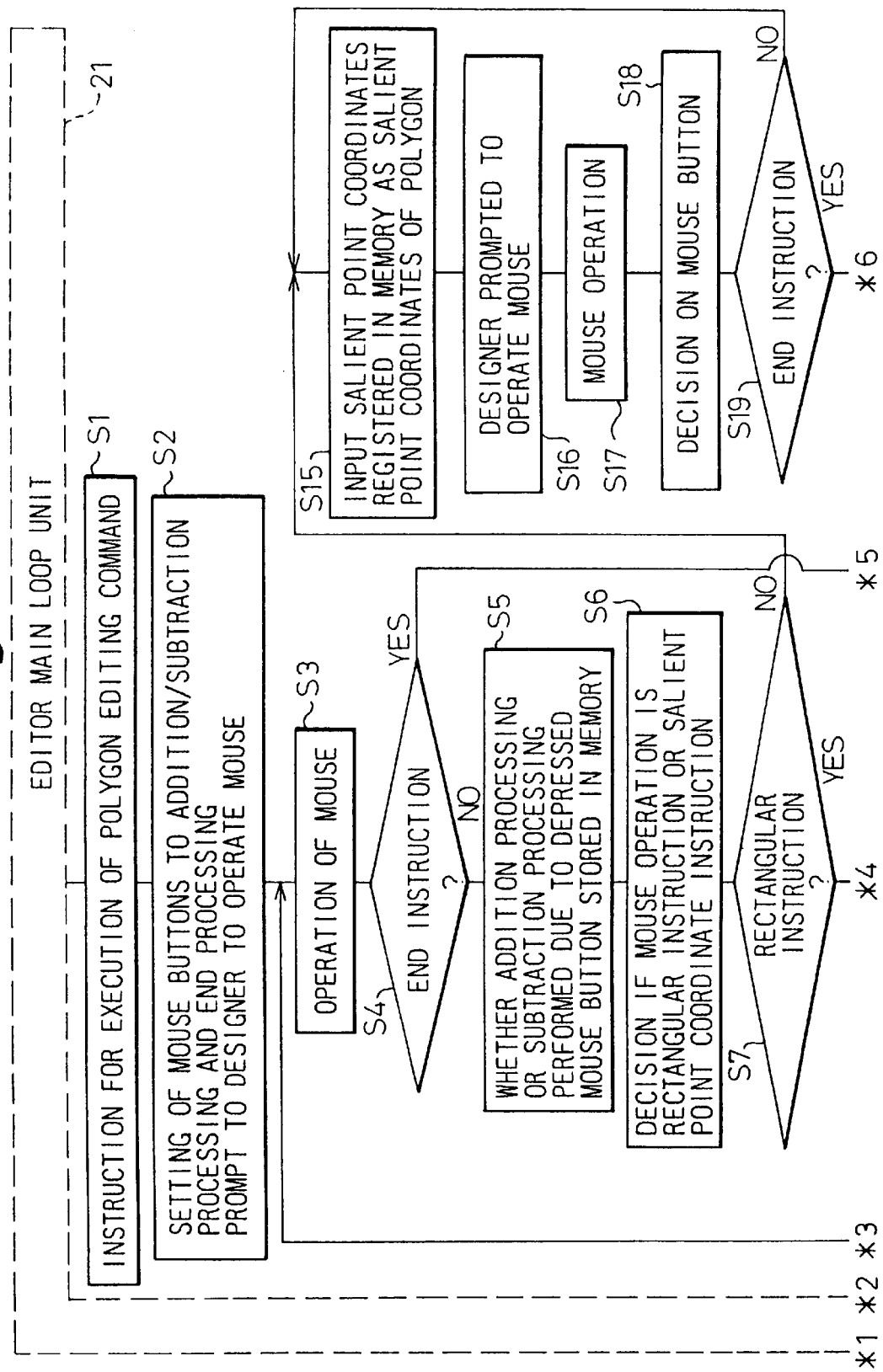
FIG. 15 is a flow chart (part 1) showing the flow of processing executed under the configuration of FIG. 2.
Figure 16:
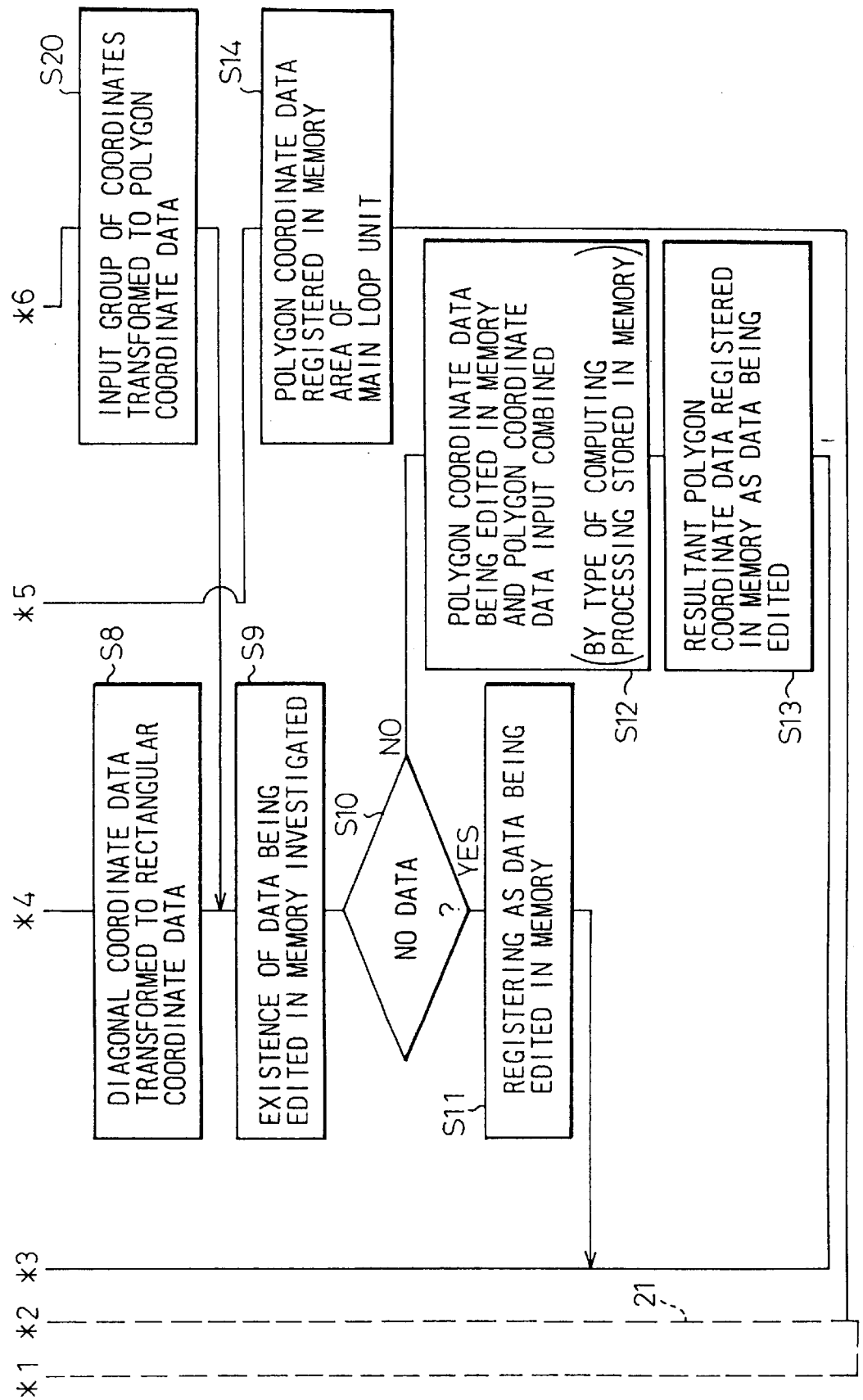
FIG. 16 is a flow chart (part 2) showing the flow of processing executed under the configuration of FIG. 2.

FIG. 15 and FIG. 16 are flow charts showing the flow of processing executed under the configuration of FIG. 2.

Assume that the command for editing an N-gonal (in the figure, given as a polygon) graphic is issued from the editor main loop unit 21 (step S1). Note that the editor main loop unit 11 of FIG. 1 and the editor main loop unit 21 shown in FIG. 2, FIG. 15, and FIG. 16 are substantially the same.

Under the polygon editing command, the operation discrimination processing means 22 of FIG. 2 is driven and the buttons of the mouse are set to addition processing, subtraction processing, and end processing. The designer is then prompted to operate the mouse 42 (step S2).

If the button of the mouse which is operated does not instruct an end to the execution of the command (step S3 and step S4 NO), whether the operated button designates "addition processing" or "subtraction processing" is stored in the memory.

Next, it is decided if the operation of the mouse is a rectangular command (drawing diagonal while depressing button) or a salient point coordinate command (successively designating salient points of a desired polygon) (step S6). If a rectangular command (YES at step S7), the routine proceeds to step S8 of FIG. 16 where the data is transformed into a rectangle having that diagonal. This is performed by the rectangular coordinate fetching unit 23-1 of FIG. 2.

At step S9, it is investigated if there is graphic data in the memory. If there is no graphic data (YES at step S10), then the graphic data of step S8 is registered in the memory (step S11).

If there is graphic data (NO at step S1), the graphic data in the memory and the graphic data designated at step S8 are combined. This is performed by the graphic computing means 24 of FIG. 2. At this time, if the left button of the mouse 42 is operated, the two above graphics are added, while if the middle button is operated, the graphic currently input is removed from the original graphic. Note that the right button is assigned the end instruction.

The coordinate data of the resultant polygon is registered in the memory area of the editor main loop unit 21 by the graphic registering means 25 of FIG. 2. The registration of the coordinate data of the polygon in the memory area is performed as well when the right button (end instruction) of the mouse is depressed (step S14).

When it is decided at step S7 that the command is not a rectangular command, that is, when it is decided that the command is by coordinates of salient points, the processing is transferred to the salient point coordinate fetching unit 23-2 of FIG. 2. The designer is then prompted to operate the mouse (steps S15 and S16).

If the designer depresses the right button of the mouse (end instruction) (steps S17, S18, and steps S19 YES), the group of coordinates obtained by designation of the salient points of the polygon is converted to coordinate data of the salient points (step S20). The routine then proceeds to the above step S9.

FIG. 17 to FIG. 22 are views showing an example of the process for editing a polygonal graphic by the configuration shown in FIG. 2.

Figure 17:
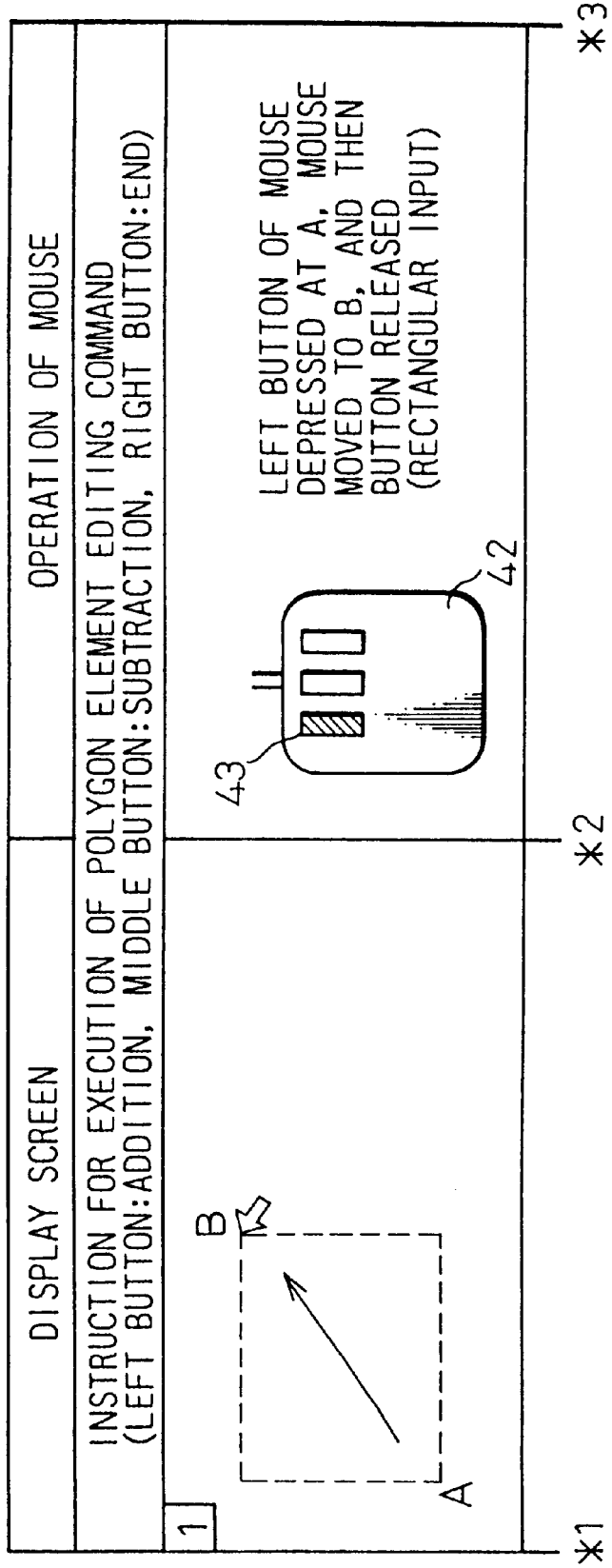
FIG. 17 is a view (part 1) showing an example of the process for editing a polygonal graphic by the configuration shown in FIG. 2.

At step 1 in FIG. 17, first, the rectangle shown by the dotted line is formed by the method of input of designation of a rectangle (designation of diagonal line by cursor), for example.

Figure 18:
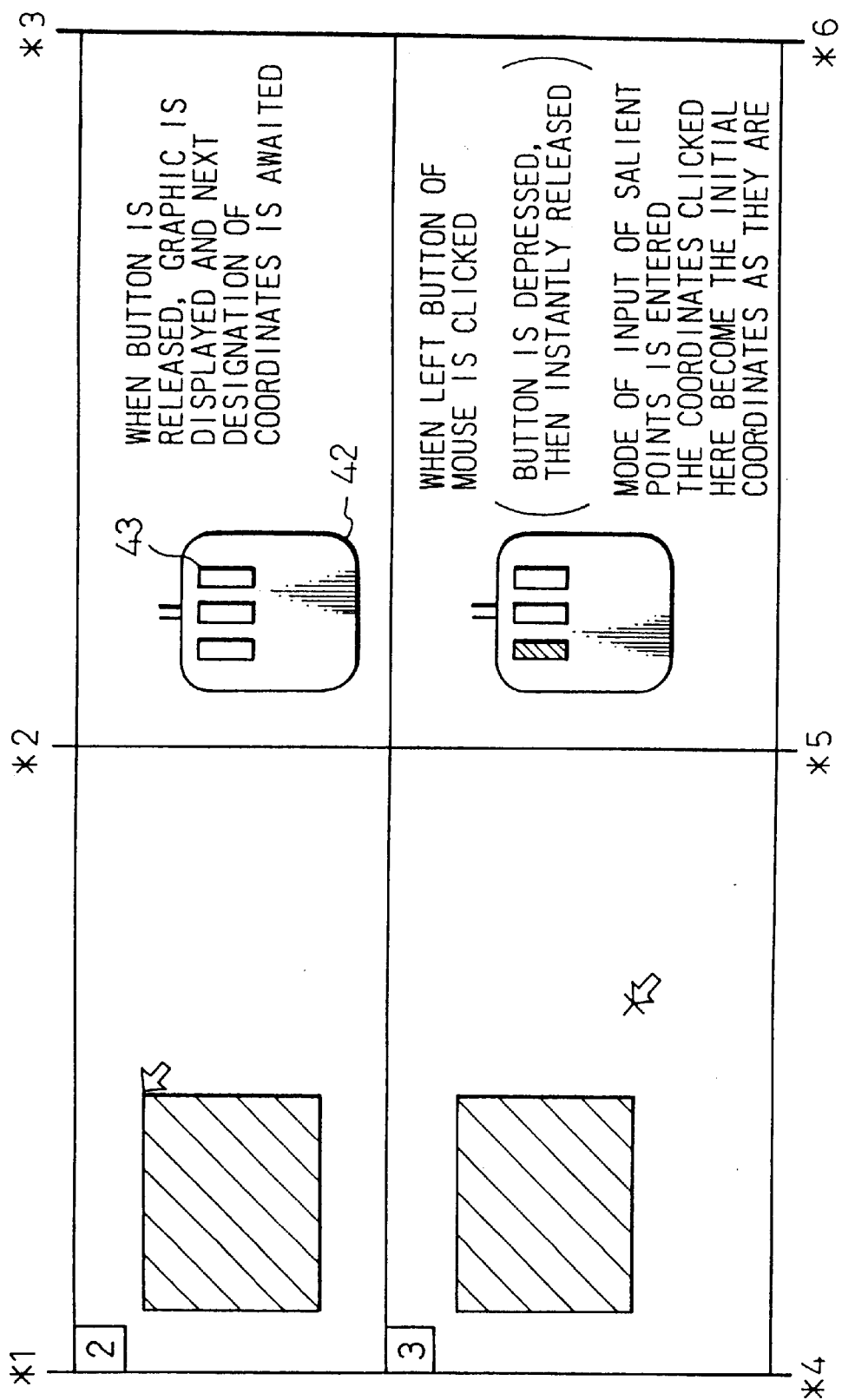
FIG. 18 is a view (part 2) showing an example of the process for editing a polygonal graphic by the configuration shown in FIG. 2.

At step 2 of FIG. 18, the rectangle is completed.

At step 3, another polygon desired to be combined with the rectangle is started to be prepared. The left button is then clicked to designate the coordinates of the first salient point.

Figure 19:
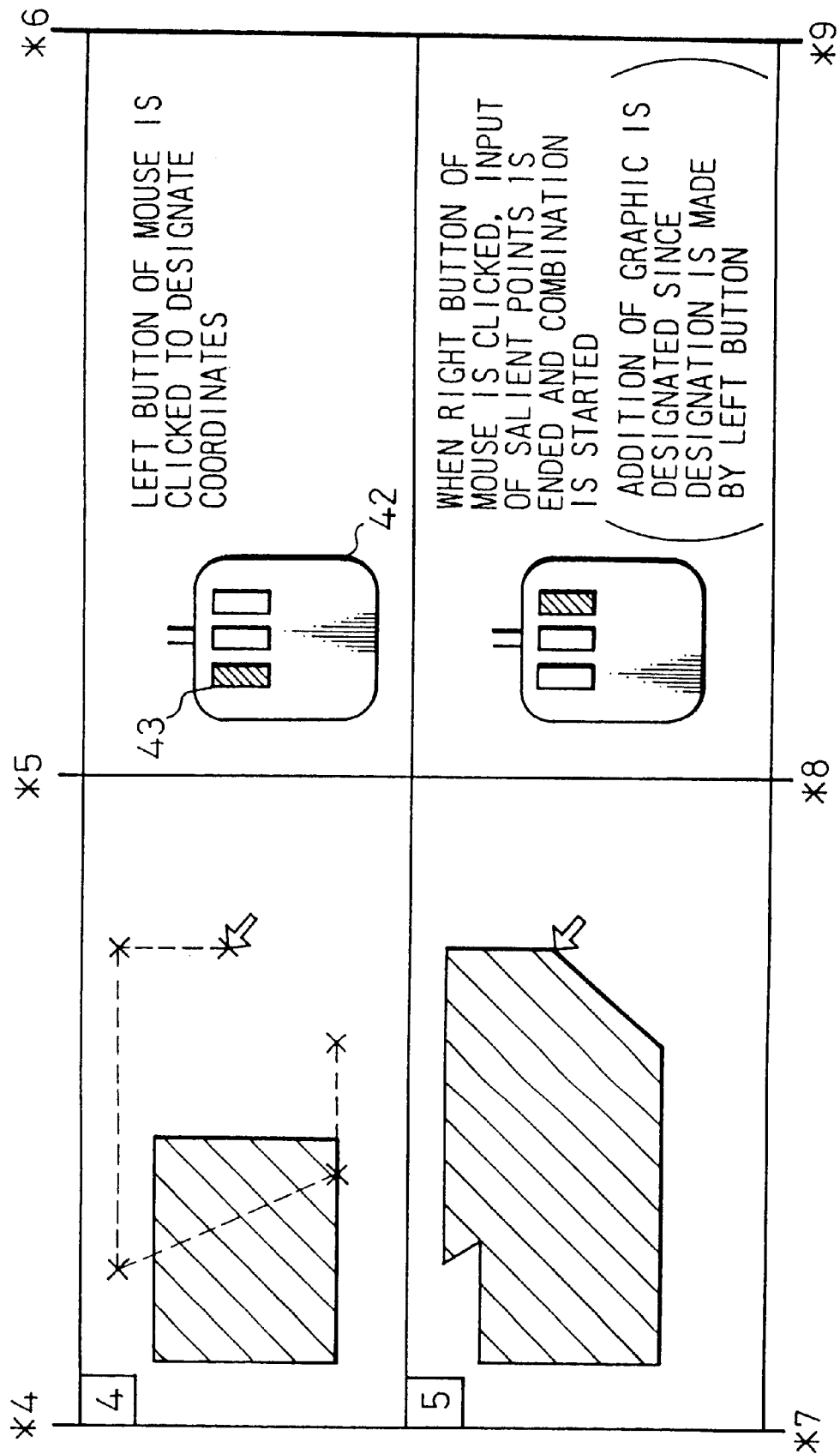
FIG. 19 is a view (part 3) showing an example of the process for editing a polygonal graphic by the configuration shown in FIG. 2.

At step 4 of FIG. 19, after step 3, the salient points of the polygon to be combined are clicked one after another by the left button.

At step 5, the right button (end instruction) is depressed. Step 2 to step 4 are performed by the left button (addition instruction), so the two polygons are combined by addition and the illustrated polygon is obtained.

Figure 20:
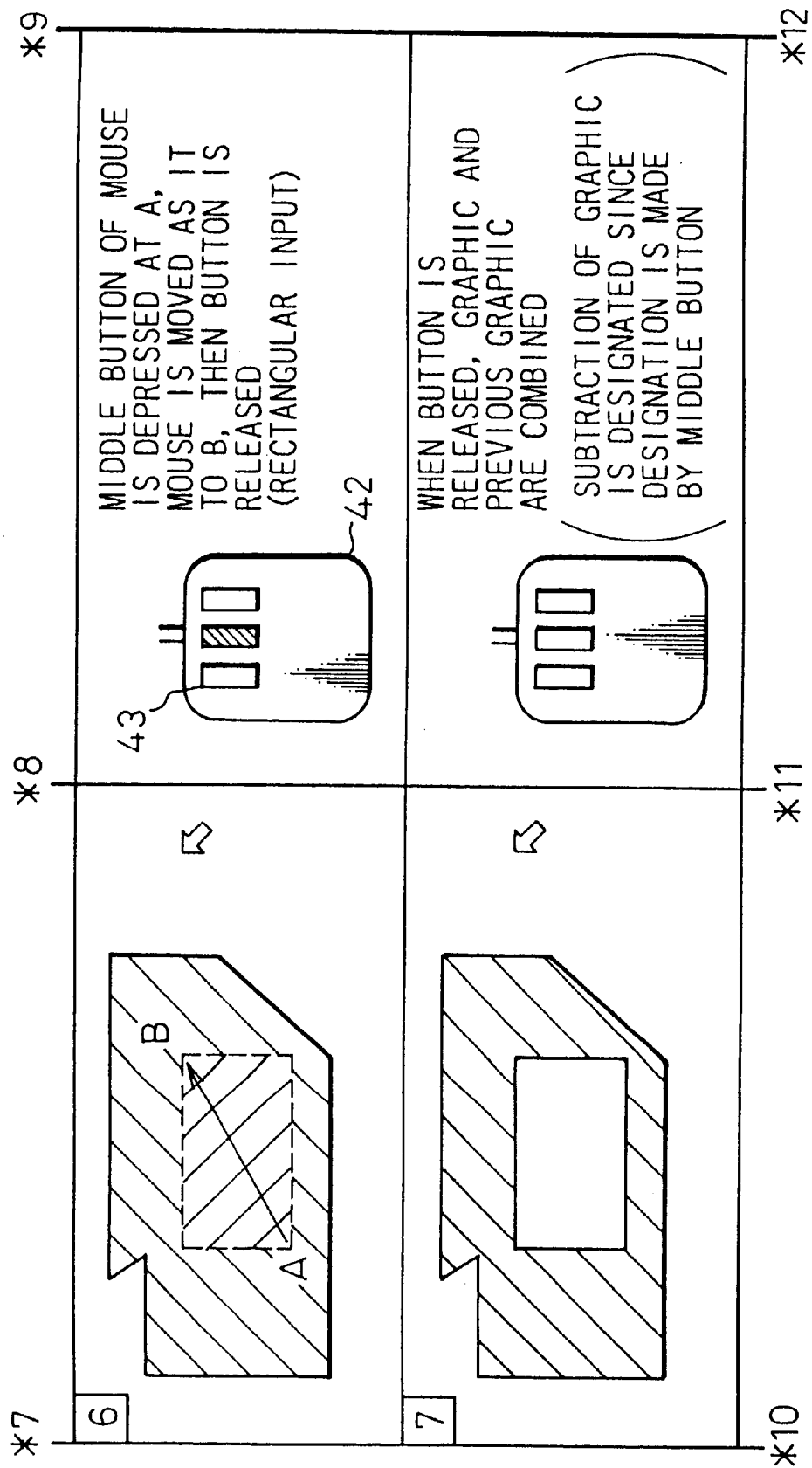
FIG. 20 is a view (part 4) showing an example of the process for editing a polygonal graphic by the configuration shown in FIG. 2.

At step 6 in FIG. 20, the middle button of the mouse is used to superpose another graphic (example of rectangle shown in the figure) on the original graphic.

When the button is released at step 7, the resultant graphic of step 6 appears. In this case, step 6 is performed using the middle button (subtraction instruction), so the resultant graphic becomes a graphic of a donut shape with the rectangle removed from the original graphic (graphic of step 5) as illustrated.

Figure 21:
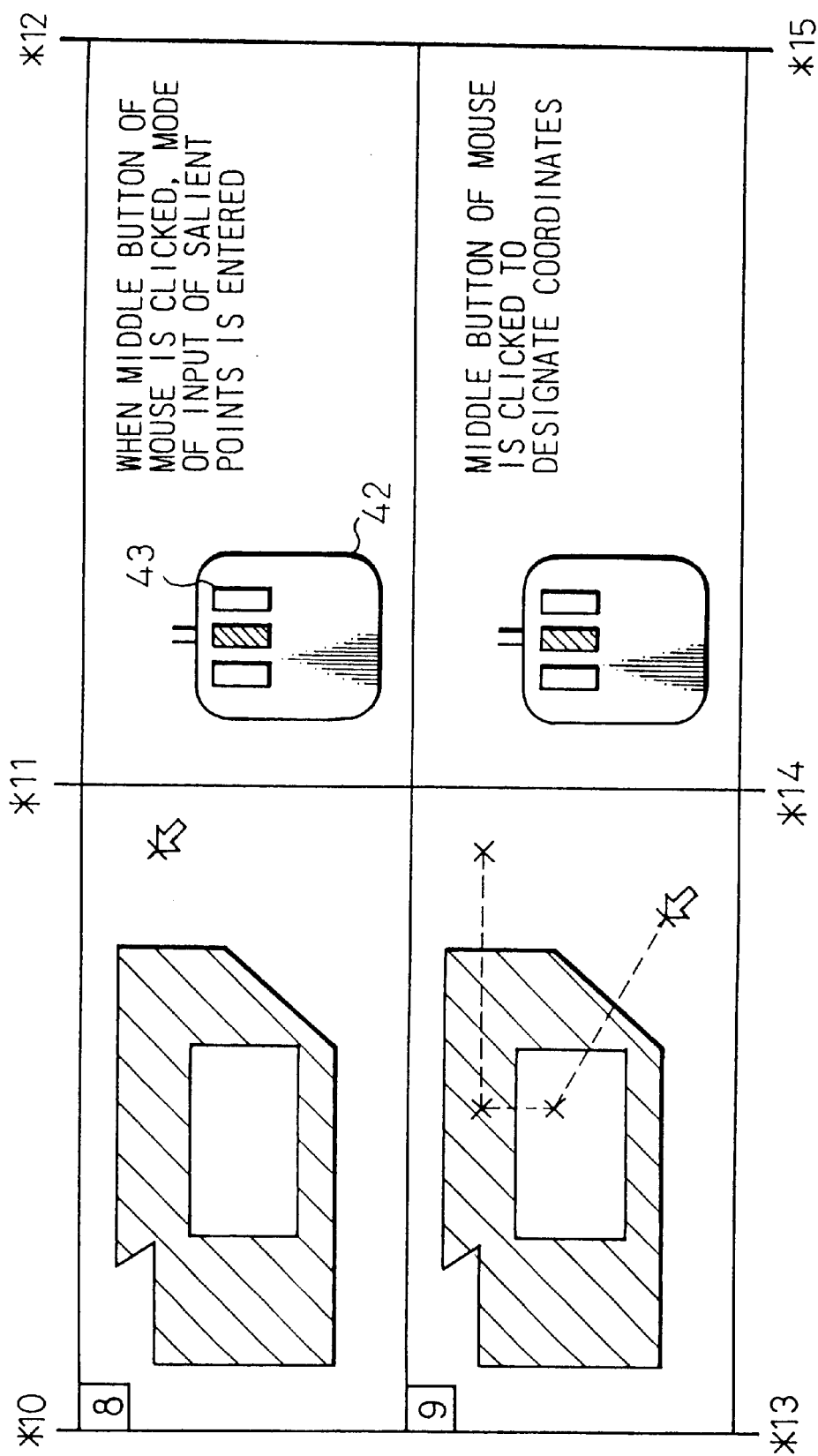
FIG. 21 is a view (part 5) showing an example of the process for editing a polygonal graphic by the configuration shown in FIG. 2.

At step 8 of FIG. 21, the middle button (subtraction instruction) is used again to form a third polygon while designating its salient points.

Step 9 shows the state where a trapezoid has been designated as one example.

Figure 22:
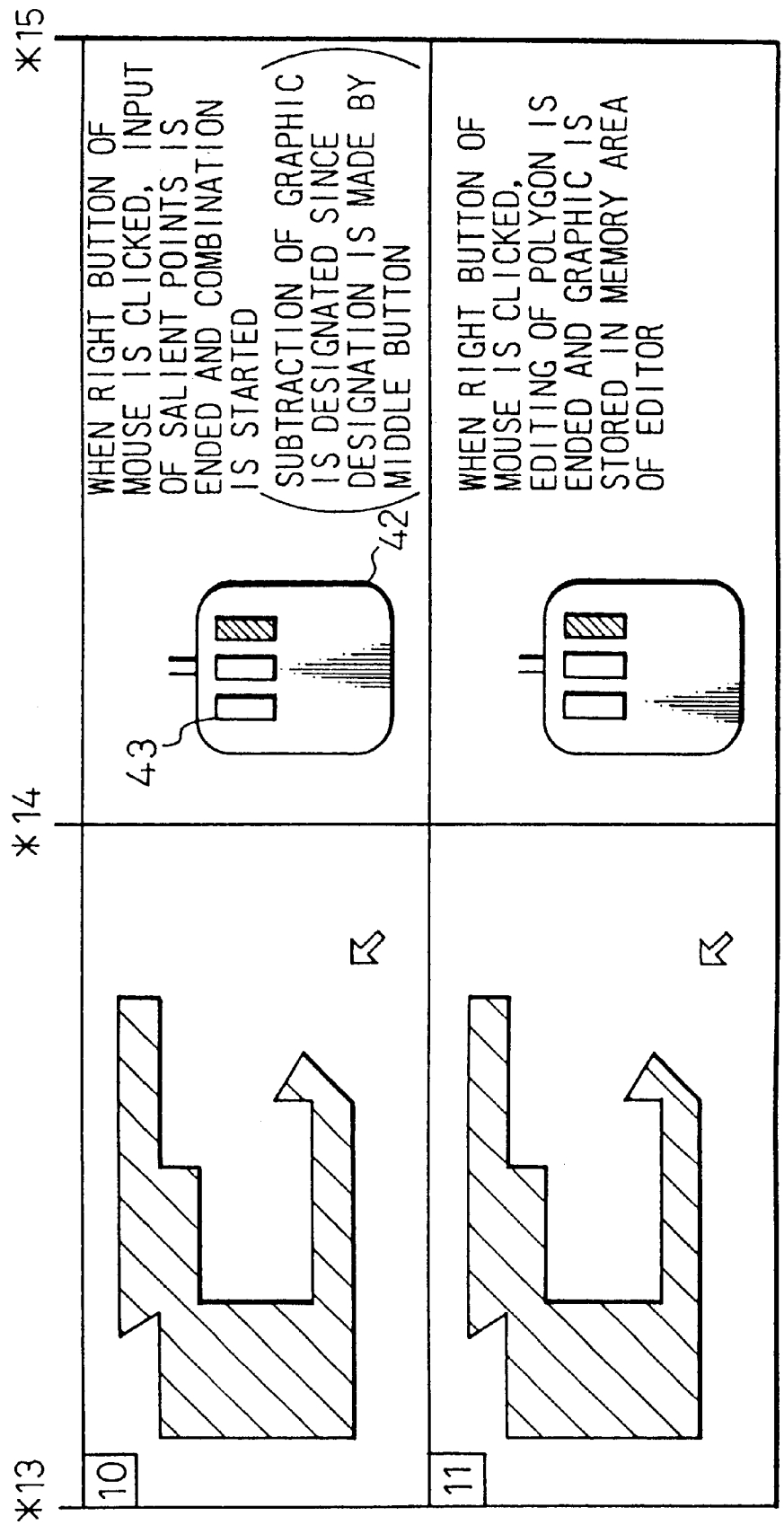
FIG. 22 is a view (part 6) showing an example of the process for editing a polygonal graphic by the configuration shown in FIG. 2.

At step 10 in FIG. 22, the right button is depressed to end the editing. In this case, the steps 8 to 9 are performed using the middle button, so the above-mentioned trapezoid is removed from the original graphic (graphic of step 7).

At step 11, the right button (end instruction) is depressed to end the editing of the desired polygon. This graphic is stored in a memory area of the editor main loop unit 21.

Figure 23:
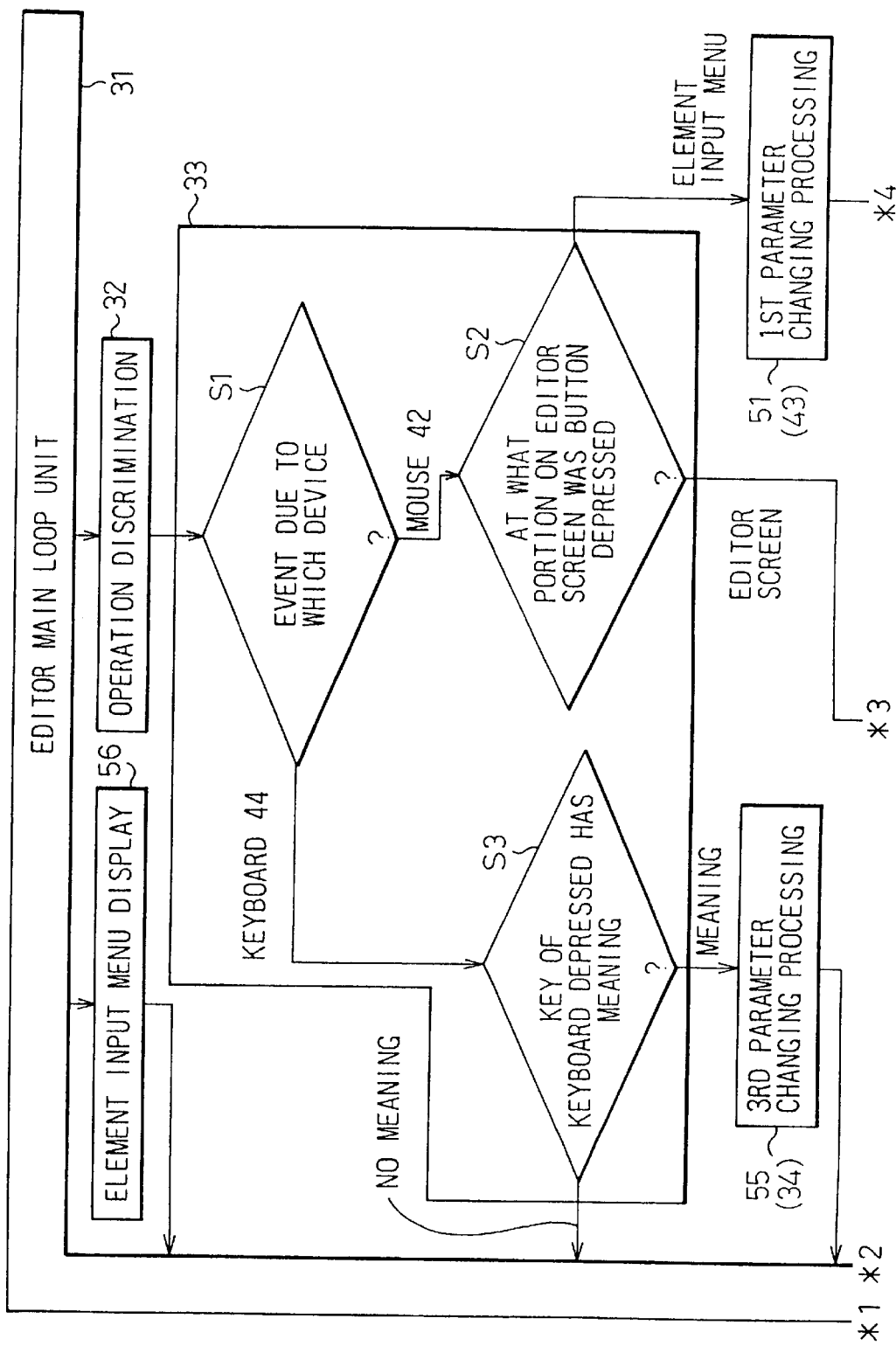
FIG. 23 is a structural view (part 1) showing the configuration of FIG. 3 in more detail in accordance with the flow of processing.
Figure 24:
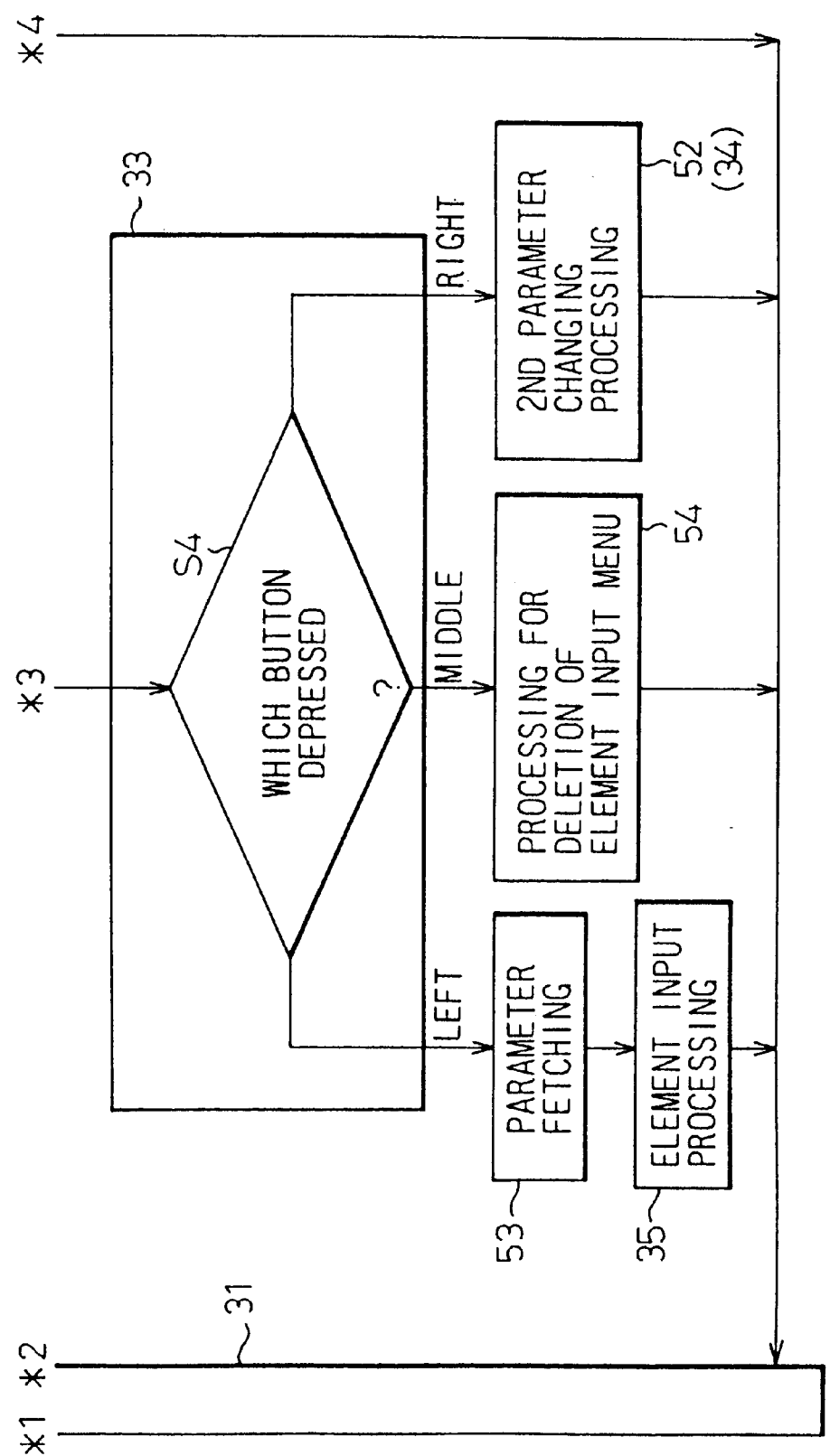
FIG. 24 is a structural view (part 2) showing the configuration of FIG. 3 in more detail in accordance with the flow of processing.

FIG. 23 and FIG. 24 are structural views showing the configuration of FIG. 3 in more detail in accordance with the flow of processing. In the figures, reference numeral 31 is the editor main loop unit. This is substantially the same as the already appearing editor main loop units 11 and 21. In FIG. 23 and FIG. 24, portions other than the editor main loop unit 31 are portions of processing for actually inputting an element.

First, the designer uses the mouse 42 to select a desired one of the collective elements displayed on the editor screen (on the display 45) to input some element required for the pattern design.

The editor main loop unit 31 detects the event of the depression of the button 43 of the mouse and transfers the processing to the element input menu display means 56.

The element input menu display means 56 displays the menus for interconnection patterns, lands, vias, broad area conductors, etc. At this time, the means 56 recognizes that execution of an input command for an element has been started.

The editor main loop unit 31 transfers the processing to the operation discrimination processing means 32 to enable discrimination as to the event which occurred. Further, the event decision means 33 decides at which device the event has occurred (step S1).

If, the event has occurred from the keyboard 44, it is decided if the depressed key of the keyboard 44 has any meaning (step S3). If the depressed key has no meaning, the processing is returned to the editor main loop unit 31.

If the depressed key has meaning, the processing is transferred to the third parameter changing processing means 55 (corresponding to part of the parameter changing processing means 34 of FIG. 3), where the parameter is changed to the parameter assigned to the depressed key. The processing is then returned to the main loop unit 31.

On the other hand, if the event has occurred from the mouse 42, it is judged at what portion on the editor screen the button of the mouse was depressed (step S2). Further, it is decided if the depressed button 43 was the left button, middle button, or right button (step S4).

If it was the left button, processing is executed by the element input processing means 35 after passing through the element input parameter fetching means 53 for fetching the element input parameter from the element input menus displayed by the element input menu display means 56.

If it is decided at step S4 that the middle button has been depressed, the processing is transferred to the element input menu deletion means 54 to delete the element input menu displayed. Next, the processing is returned to the main loop unit 31 in the assumption that the command for input of the element has finished being executed.

If it is decided at step S4 that the left button has been depressed, it is decided that the event was for changing a parameter to one of the parameters defined in the command for input of the elements and the processing is transferred to the second parameter changing processing means 52 (part of the parameter changing processing means 34 of FIG. 3). When the change of the element input parameter is completed, the processing is returned to the main loop unit 31.

When it is decided at step S2 that an event has occurred on the element input menu, the processing is transferred to the first parameter changing processing means 51 (part of the parameter changing processing means 34 of FIG. 3) to enable processing for changing the element input parameters. When this changing processing is completed, the processing is returned to the main loop unit 31.

The above change of the parameters can be performed without ending the input command, i.e., even during operation of an input command.

Here, an example of actual operation will be shown taking as an example the case of input of an interconnection pattern.

Figure 25:
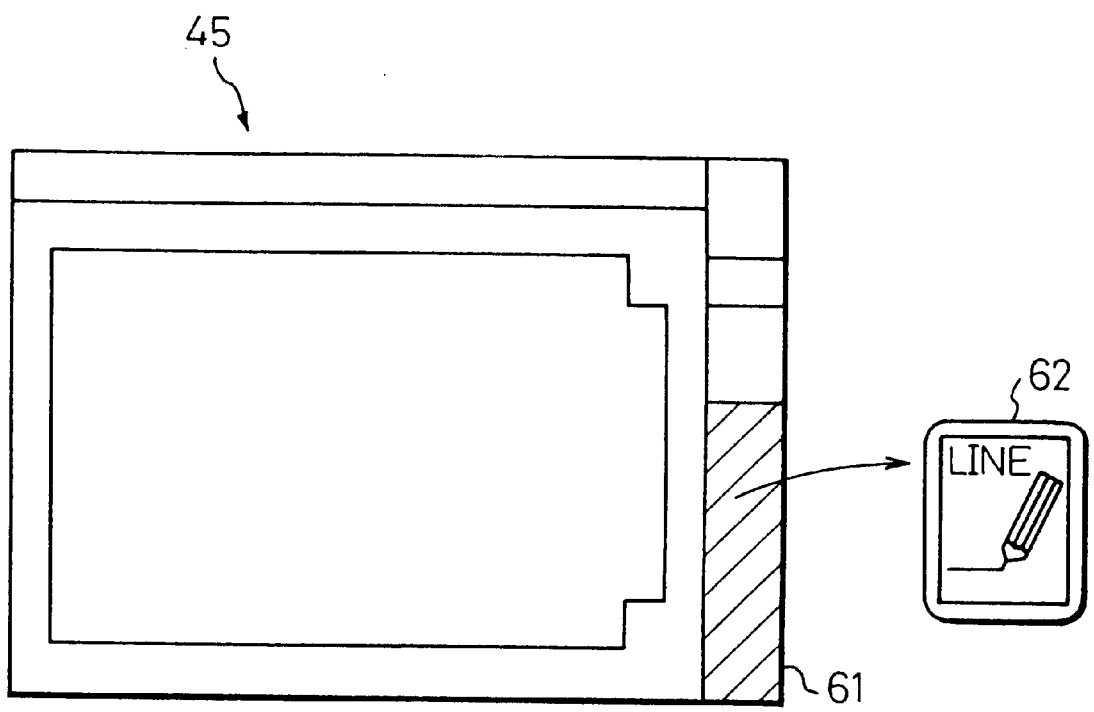
FIG. 25 is a view (part 1) showing an example of the actual operation.
Figure 26:
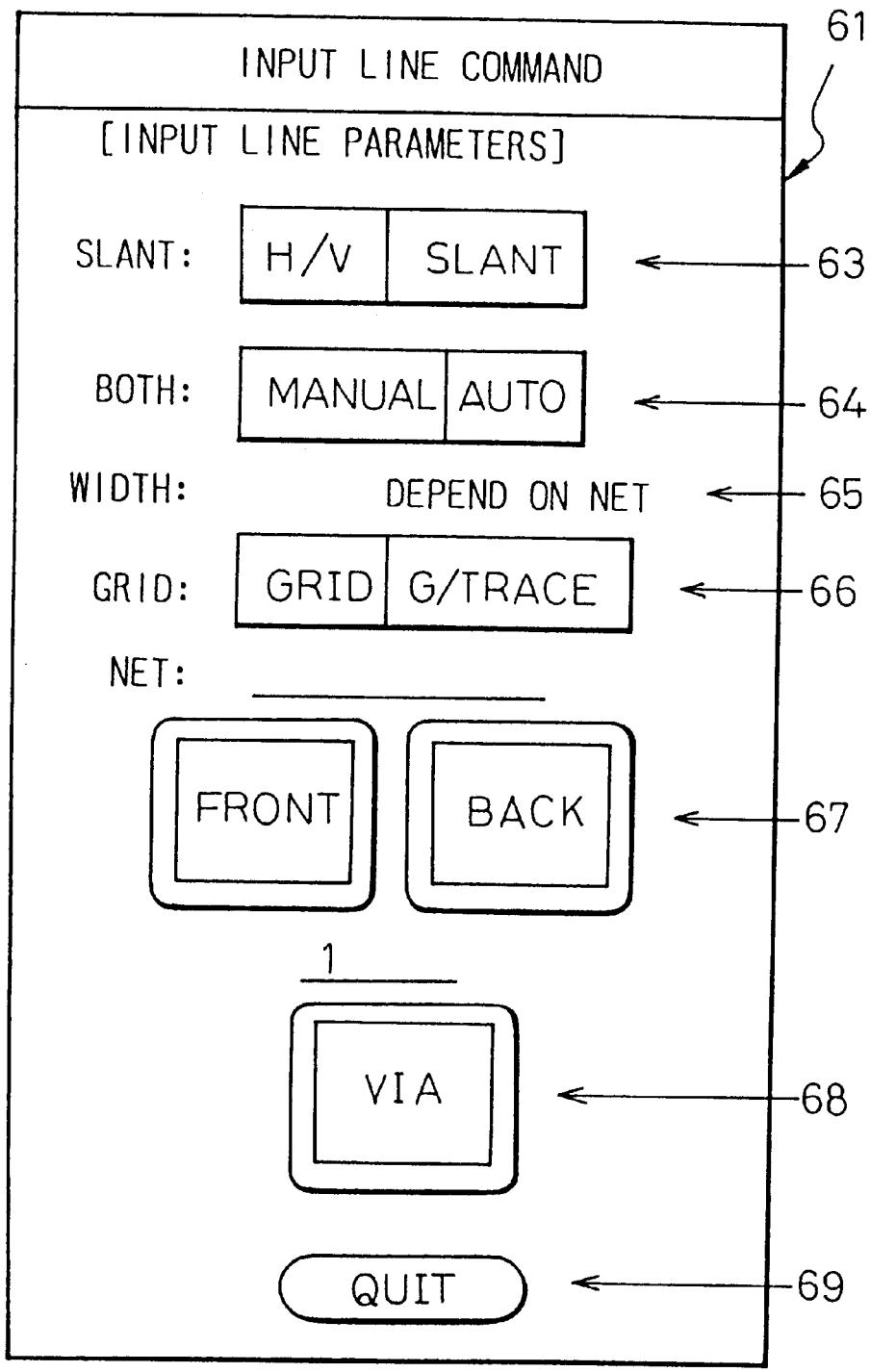
FIG. 26 is a view (part 2) showing an example of the actual operation.

FIG. 25 and FIG. 26 are views showing an example of the actual operation.

In FIG. 25, the illustrated editor screen is shown on the display 45. In this, the area 61 is the menu display area. When the "LINE" in the menu (61) is selected by the button 43 of the mouse 42, a menu is opened for setting parameters for inputting interconnection patterns shown in FIG. 26. Note that the menu icon 62 in FIG. 25 shows an example corresponding to the above "LINE".

The menu in FIG. 26, in the present invention, remains on the display unless the input of the starting point of the interconnection pattern is canceled by depressing the middle button of the mouse or the "QUIT" shown at the bottom is selected in the menu shown in FIG. 26. Accordingly, the designer can freely make changes during the processing for input of the interconnection pattern.

The meanings of the areas (63 to 69) in the menu shown in FIG. 26 are as follows:

63: Choice for selecting horizontal, vertical, or slant 45 degrees/free angle

Figure 27:
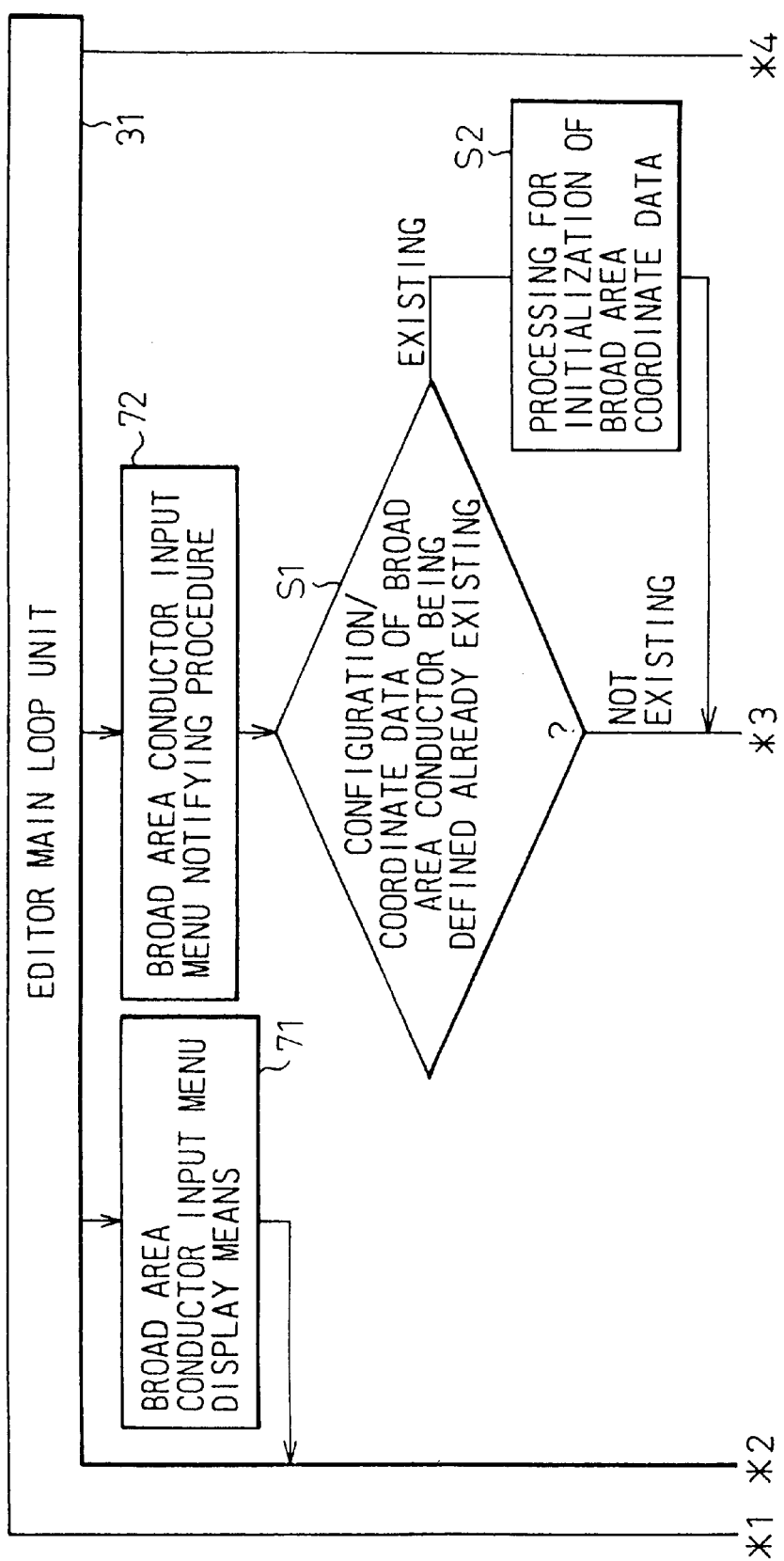
FIG. 27 is a structural view (part 1) showing the configuration of FIG. 4 in more detail in accordance with the flow of processing.
Figure 28:
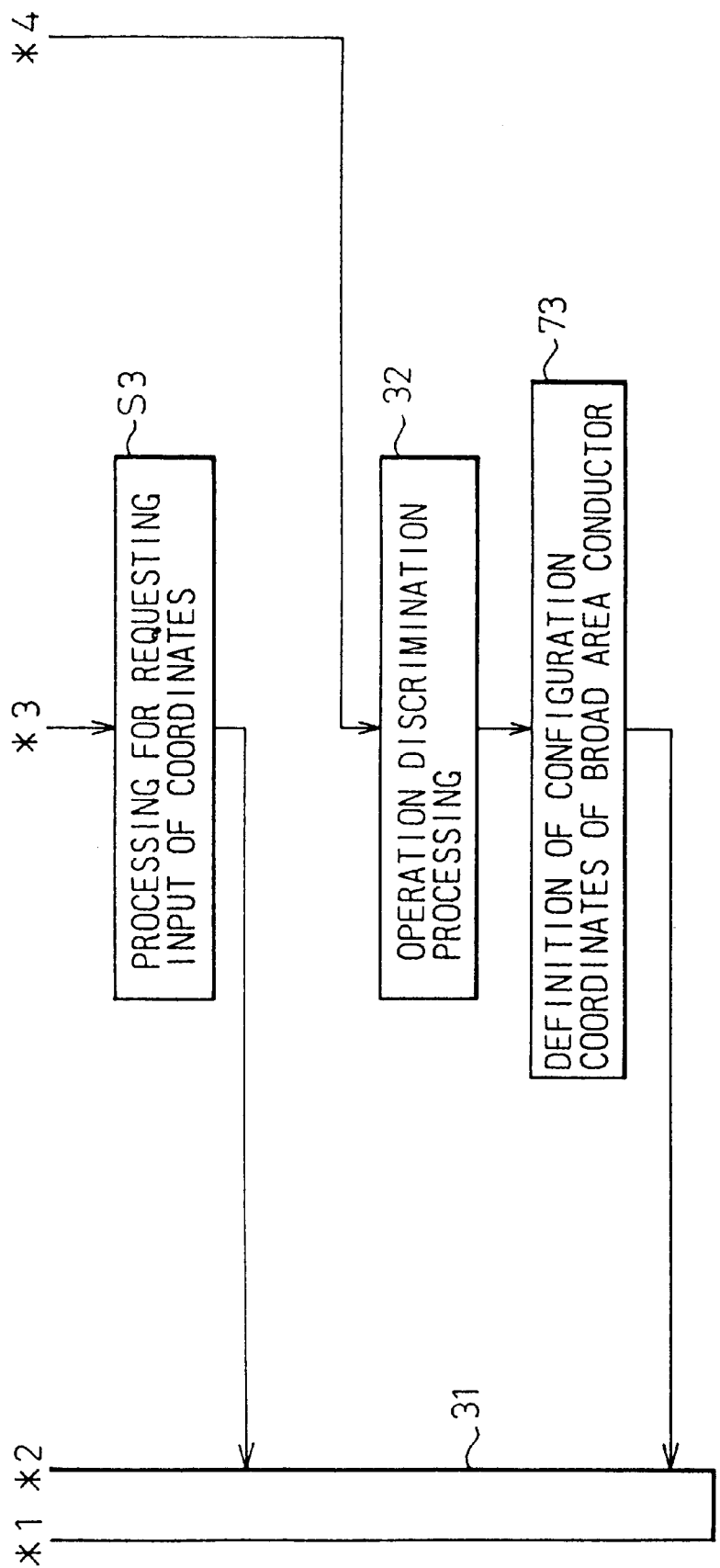
FIG. 28 is a structural view (part 2) showing the configuration of FIG. 4 in more detail in accordance with the flow of processing.

64: Choice for changing between manual/automatic formation of interconnection layer 65: Choice for designing line width 66: Choice for selecting interconnection traces 67: Button for altering interconnection layer 68: Button for generating vias 69: Button for ending command FIG. 27 and FIG. 28 are structural views showing the configuration of FIG. 4 in more detail in accordance with the flow of processing. These show the example of the case of initializing the input information (configuration coordinates) for a broad area conductor (see FIG. 22) and redefining the input information (configuration coordinates) again. Note that the menu notifying procedure 72 for inputting the broad area conductor and step S1 in FIG. 27 correspond to the event decision means 33 of FIG. 4 and step S2 in FIG. 27 and step S3 in FIG. 28 correspond to the initialization processing means 36 of FIG. 4.

The construction shown in FIG. 27 and FIG. 28 may be roughly divided into the editor main loop unit 31 for managing the events occurring on the editor screen (45) and the processing portions (71, 72, S1, S2, S3, 32, and 73) for inputting the configuration coordinates (coordinates of salient points) of the broad area conductor.

During the execution of an editing command, the editor main loop unit 31 manages the events occurring on the editor screen (45). When the designer selects a menu provided on the editor screen by the button of the mouse so as to input the configuration of the broad area conductor, the editor main loop unit 31 detects the event of "depression of a button" and transfers the processing to the broad area conductor input menu display means 71 for enabling input of information relating to the broad area conductor. The menu is then displayed on the editor screen. After this menu is displayed, the processing is returned to the main loop unit 31.

When the designer selects the input start button (GO) in the menu by the mouse, the processing is transferred to the menu notifying procedure 72 for input of a broad area conductor, which performs preparations for definition of the configuration and coordinates of a broad area conductor. Step S1 is executed as preparatory processing for this. Here, it is judged if there is input information (configuration coordinate data) of an already defined broad area conductor. If the result at step S1 is YES (there is already input information), step S2 is executed. At step S2, the already input configuration coordinates for the broad area conductor are initialized. Next, the routine proceeds to step S3.

The above step S3 is performed even when the result of step S1 is NO (there is no existing input information). At step S3, the configuration coordinates of a broad area conductor begin to be newly defined. After this, the processing is returned once again to the main loop unit 31.

The editor main loop unit 31 detects an event of "depression of a button of the mouse" even when the button of the mouse is depressed on the editor screen and transfers the processing to the operation discrimination processing means 32. Next, the processing is transferred to the configuration coordinate defining means 73 of the broad area conductor in accordance with the event which occurred. The means 73 stores the configuration coordinates of the broad area conductor defined here and once again transfers the processing to the main loop unit 31.

When defining the configuration and coordinates of a broad area conductor in the above way, the usual processing entails definition through the loop of the main loop unit 31→ operation discrimination processing means 32→ configuration coordinate defining means 73→ main loop unit 31. As opposed to this, definitions made by interrupt processing are performed through the loop of the main loop unit 31→ broad area conductor menu notifying procedure 72→ step S1 (step S2)→ step S3 (processing for requesting input of coordinates)→ main loop unit 31. By enabling such definition through interrupt processing, it becomes possible to rewrite new input information (configuration coordinates) without ending the execution of the command each time as in the past.

As explained in detail above, the present invention assigns various command functions to the plurality of buttons 43 of a mouse 42 and enables changes of the command functions in accordance with different types of commands.

As explained earlier, according to the present invention, it is possible to assign to the buttons of the mouse the command functions of, for example, "movement", "deletion", and "copying". Further, according to the present invention, it is possible to "confirm", "cancel", "change", etc. the mode of processing by depressing the designated button even during execution of a command for "movement" for example. In particular, it is possible to successively change the range of application of processing by repeated operation of the same button. In the example given above, during a command for deletion of a line, it is possible to easily change the range of application from a line segment→ a previous line segment stretching to that line segment→ all line segments with the same potential as that line segment by successive depression of a button. For example, it is possible to change the range from just the selected line → everything up to the initial branch point→ one component pin to another component pin→ all lines of the same potential.

A specific detailed example realizing this operation will be explained below.

Figure 29:
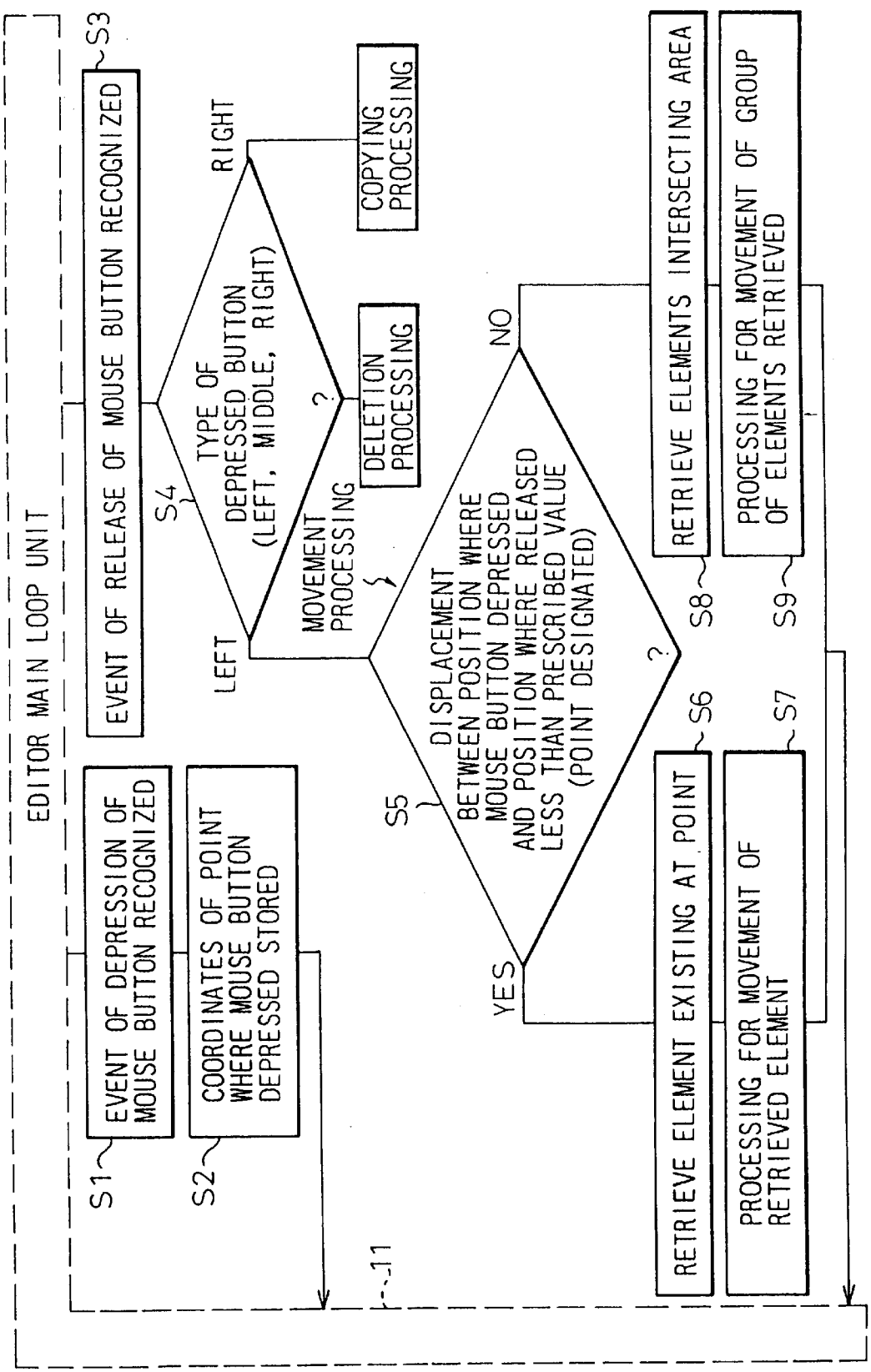
FIG. 29 is a view showing the processing for "movement", "deletion", and "copying"

FIG. 29 is a view showing the processing for "movement", "deletion", and "copying". In the figure, at steps S1 and S2, the coordinates at the time of depression of a button 43 of the mouse 42 are recognized.

At step S3, the coordinates at the time of release of the button of the mouse are recognized.

At step S4, decision is made as to which of the left button, middle button, and right button the operated button was.

Steps S5 to S9 show the routine for processing for movement, but the processing for deletion and the processing for copying are performed by similar routines as steps S5 to S9. Steps S6 and S7 show the route in the case where a point has been designated by the mouse, while steps S8 and S9 show the route in the case where it is decided that an area (previously mentioned rectangle) has been designated by the mouse.

The window system used in this embodiment functions so as to automatically call up a function defined in advance for an event when an event occurs in the window (movement of the mouse, depression of a button of the mouse, release of a button of the mouse (distinguished as to left, middle, and right), etc.).

The editor main loop unit 11 of FIG. 29 is the portion which manages these events.

Figure 30:
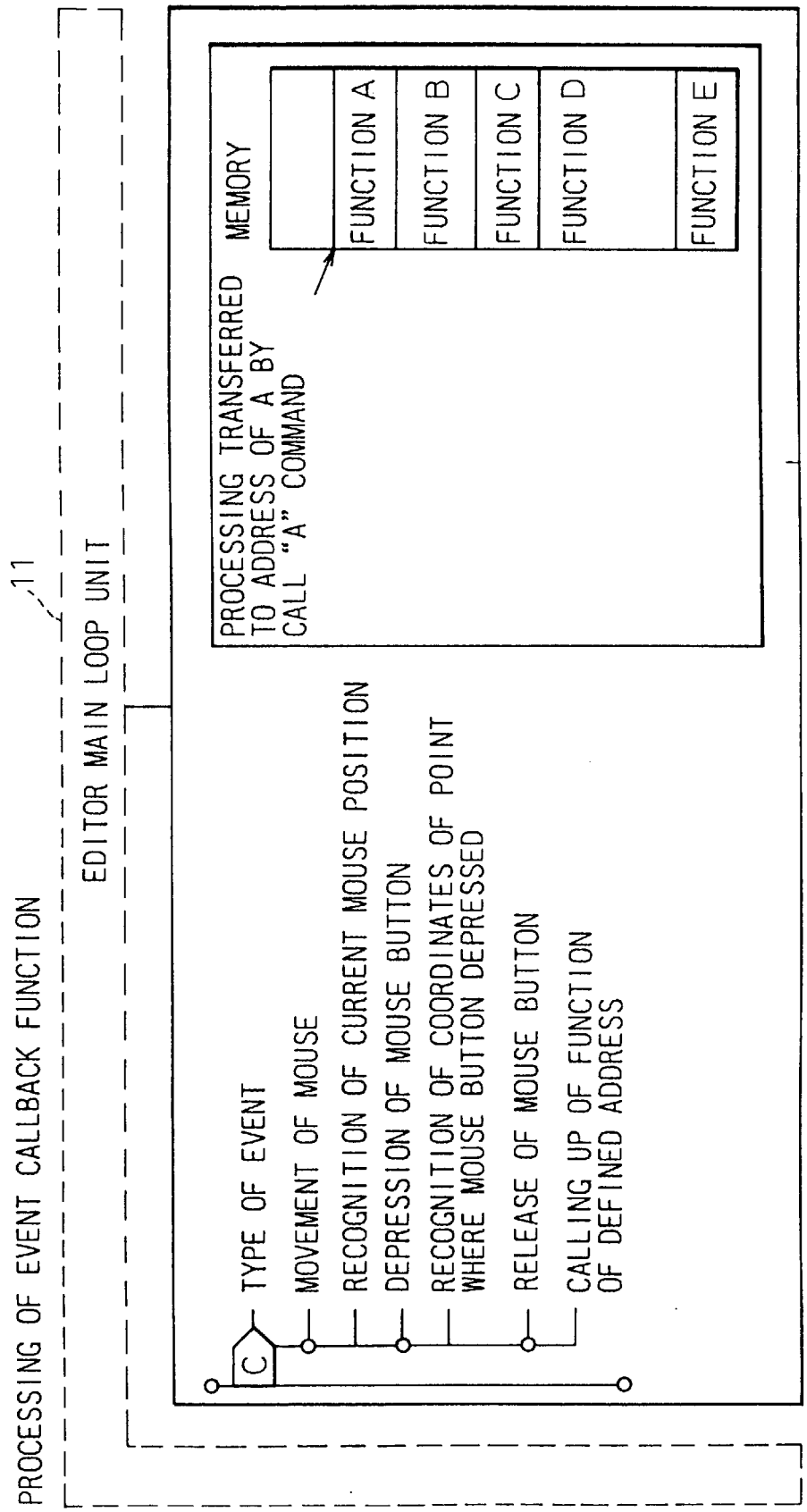
FIG. 30 is a view showing schematically the processing of an event call-back function.

FIG. 30 is a view showing schematically the processing of an event call-back function. In the event call-back function of this embodiment, note is taken of the events of depression of a mouse button and release of a mouse button. When an event consisting of a release of a button occurs, the defined functions are called up. A decision is made as to which button was released and the function for performing the movement, deletion, or copying corresponding to the button which was released (left, middle, and right) is called up from among the defined functions.

In FIG. 30, illustration is made of the processing of "call up the function of the defined address" at the bottom left of the figure. In C language, "call up a function" has the same meaning as transferring processing to a certain address in the memory. The state of calling up the function A, for example, is shown at the right of the figure.

In general, when calling up a function in the C language, the following is given:
 ret=function name (parameter group);
For example,
 ret=ea_cmang(x,y);

This function name has the same meaning as the address of a function in the memory. If the function name is not clearly stated, but the address of the function is stated, this has the same meaning as calling up a predetermined function. Accordingly, by the method of description enabling designation of the address of the function without describing the name of the function, it becomes possible to freely change the called up function.
For example, if
 the call address is declared to be: int(*command)();
 calling by address: ret=command ();
when for example calling up the function_A and the function_B, the result is command=function_A;

ret=command();    (a)

command=function_B;

ret=command();    (b)

These have the same meaning as the following (a') and (b'):

ret=function_A();    (a')

ret=function_B();    (b')

In the final analysis, by setting the call address to an external reference variable, it becomes possible to rewrite the called up functions at any location in the program and possible to call up an unlimited number of functions from inside a single function.

Figure 31:
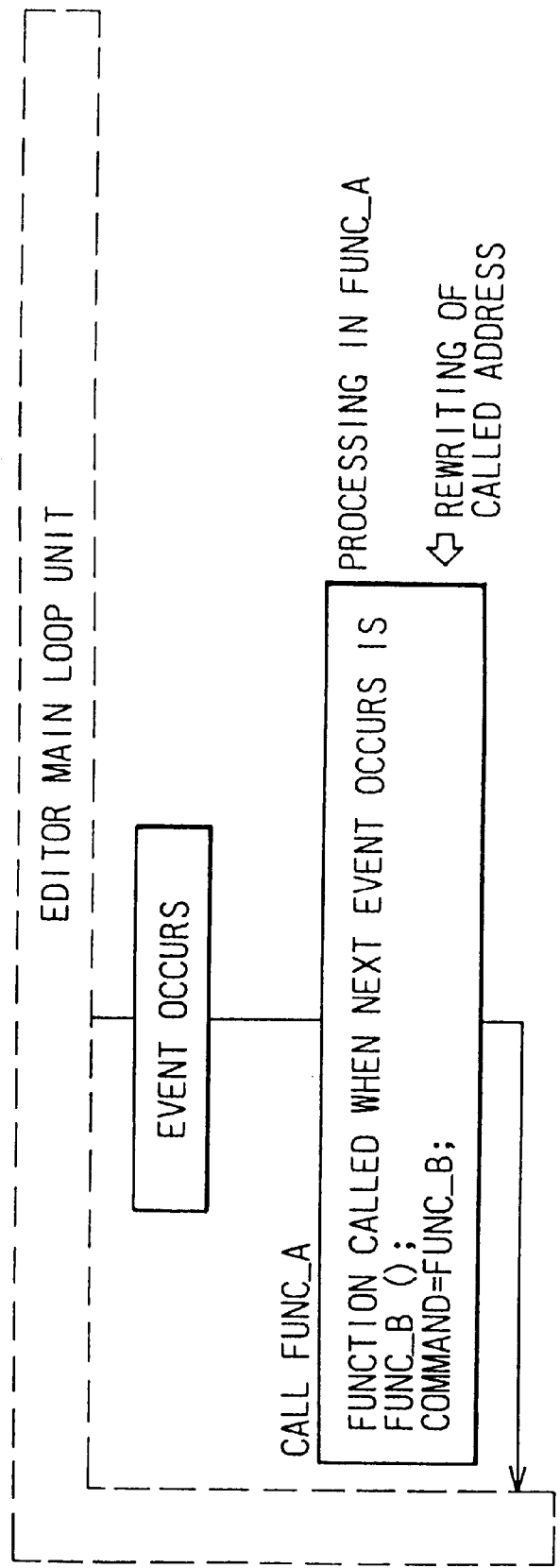
FIG. 31 is a view (part 1) showing an example of sequential rewriting of the called-up functions.
Figure 32:
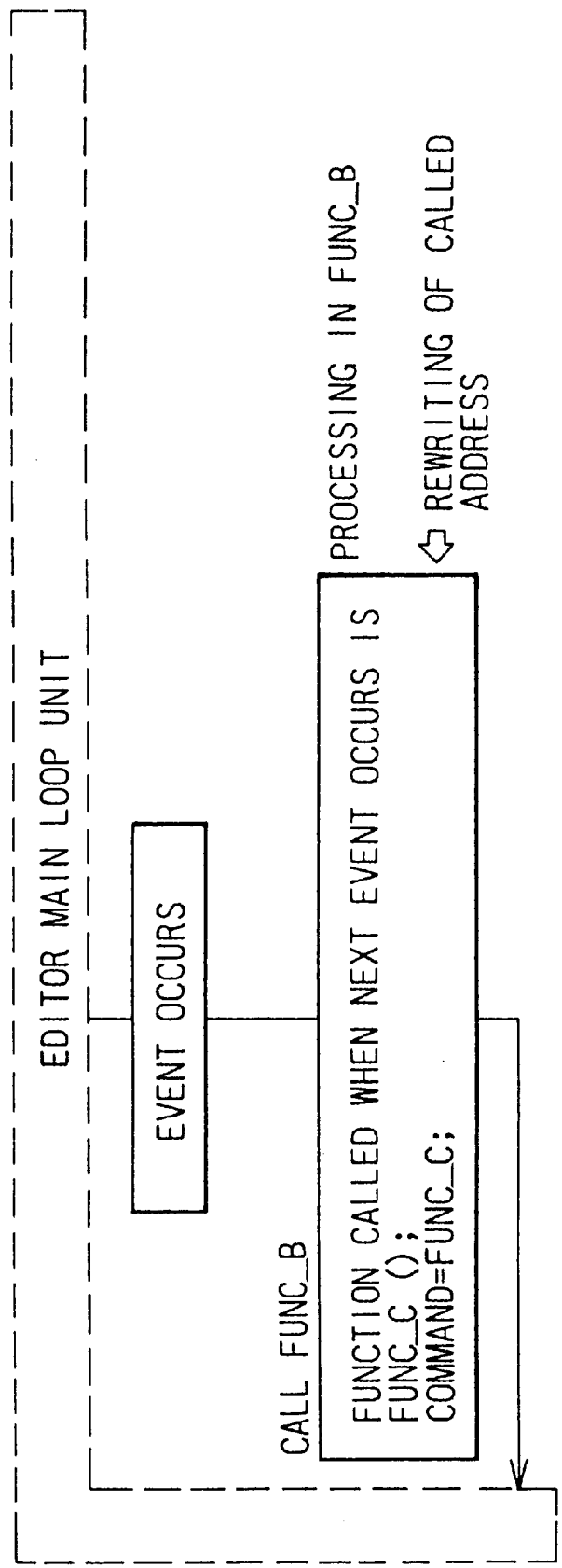
FIG. 32 is a view (part 2) showing an example of sequential rewriting of the called up functions.
Figure 33:
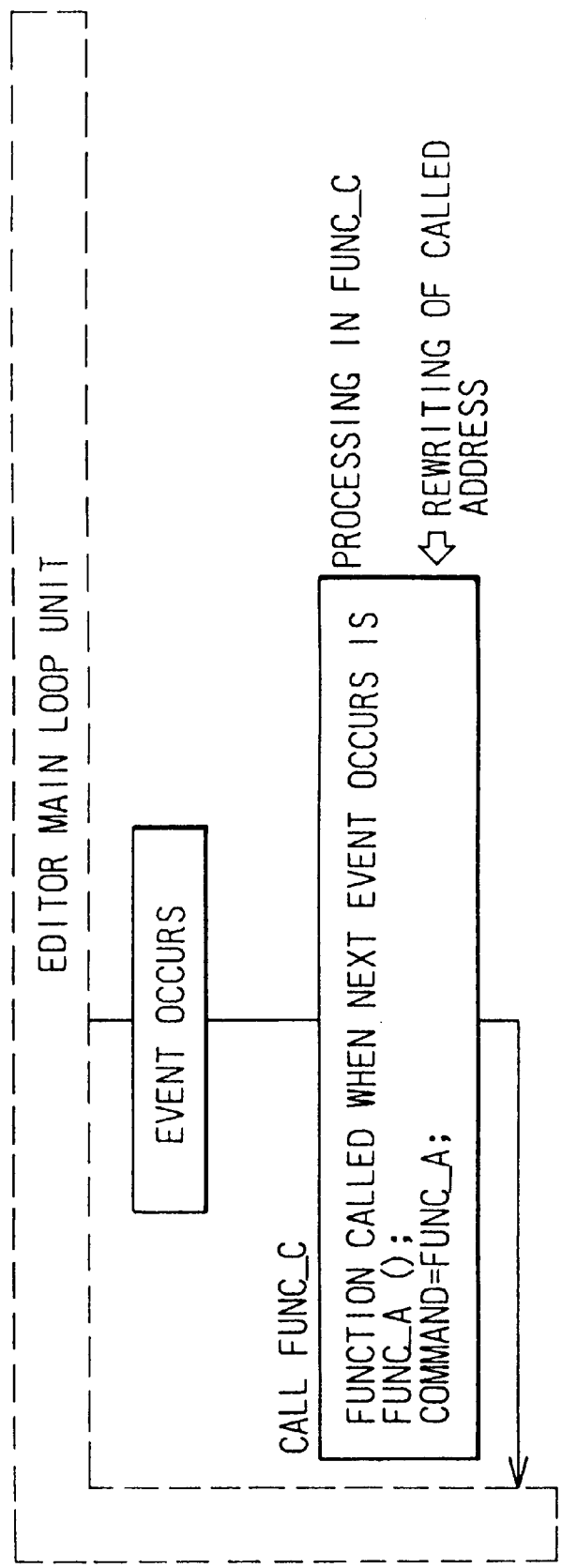
FIG. 33 is a view (part 3) showing an example of sequential rewriting of the called up functions.

FIG. 31 to FIG. 33 are views showing an example of sequential rewriting of called up functions.

By sequentially rewriting the called up functions, it is possible to freely call up functions describing the required processing for the occurring event. That is, it becomes possible to virtually rewrite the configuration of the functions of a program in the program.

When a first event occurs, first, the func_A is called up. That is, the function called up at the time of occurrence of an event is
 func_A ( ):
 command=func_A.

In FIG. 31 (calling of func_A), when the next event occurs, the func_B is called up instead of the func_A.

Similarly, in FIG. 32 (calling of func_B), when the next event occurs, the func_C is called up instead of the func_B, and in FIG. 33 (calling of func_C), when the next event occurs, the func_A is called up instead of the func_C.

Figure 34:
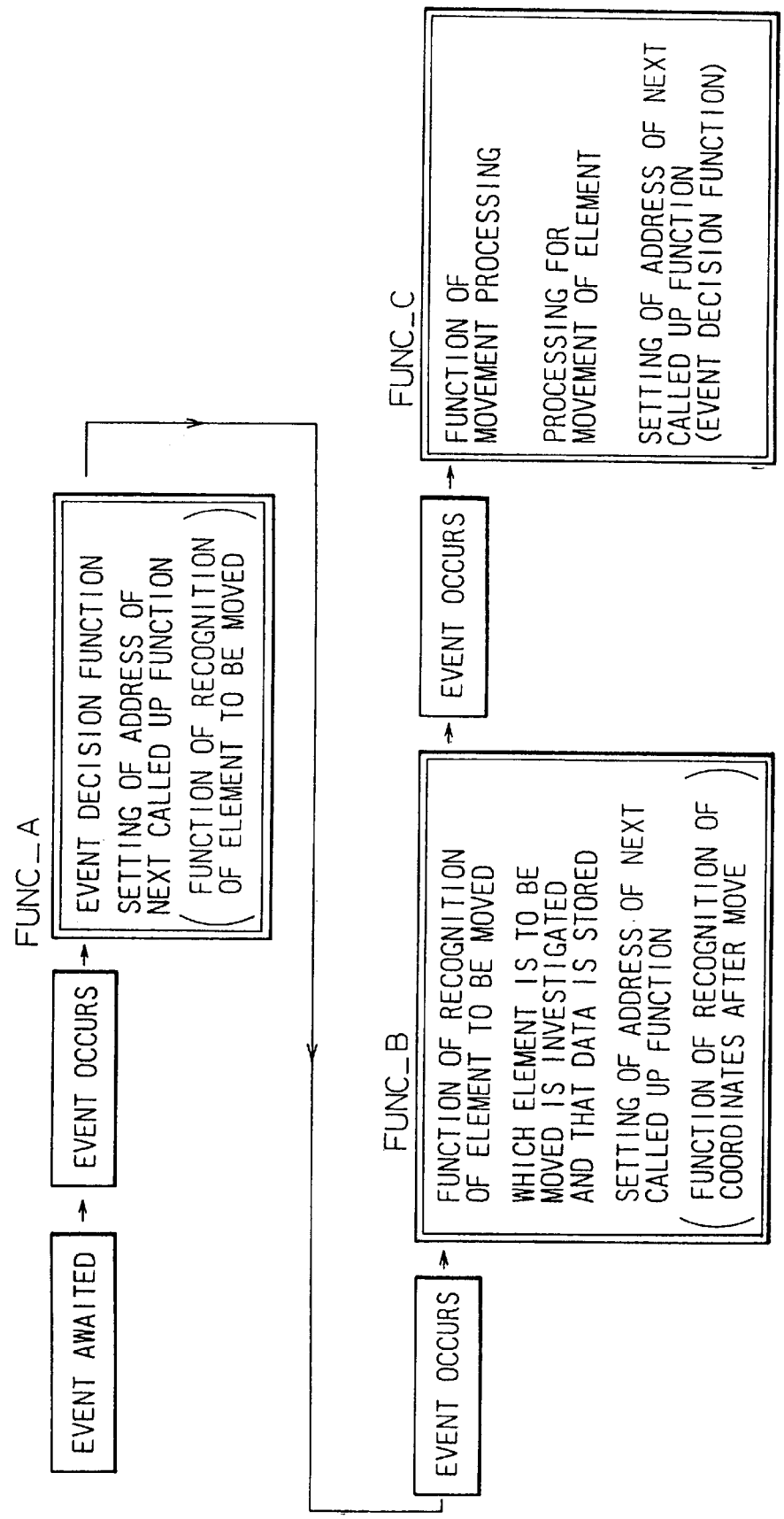
FIG. 34 is a view showing an example of the processing for realizing movement of an element.

FIG. 34 is a view showing an example of the processing for realizing the movement of an element. This is an example of depression of the left button (movement) of the mouse. With the fun_A, the input of the element to be moved is requested, with the func_B, the input of the coordinates after movement of the element is requested, and with the func_C, the input of the new command is requested.

Next, an explanation will be made of a specific, detailed example of the case of changing the mode of processing, that is, changing the range of application of the processing mentioned above.

The means for changing the mode of processing makes use of the technique of changing the addresses of the above-mentioned called functions. Below, an example is shown of processing in the case of movement of a line.

Figure 35:
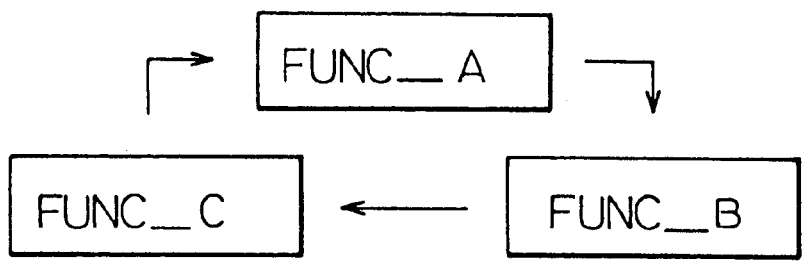
FIG. 35 is a view showing a first example of the transition of the functions.
Figure 36:
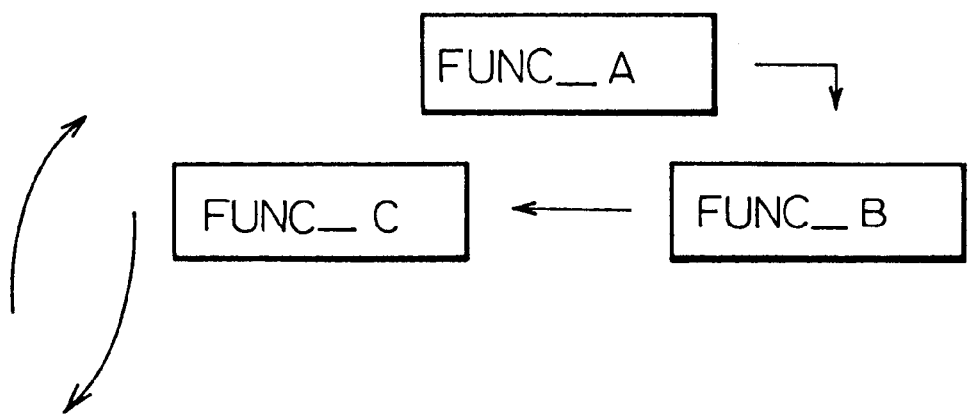
FIG. 36 is a view showing a second example of the transition of the functions.

First, the functions are defined as follows:
 func_A: command selection processing function
 func_B: line selection processing function
 func_C: function for obtaining coordinates after movement FIG. 35 is a view showing a first example of the transition of the functions, and FIG. 36 is a view showing a second example of the transition of the functions. In the state of FIG. 35, each time an event occurs, the called function is changed from func_A→ func_B→ func_C→ func_A. In this case, the called function after the func_C may be made the func_C again. This state is shown in FIG. 36. In FIG. 36, when calling up the func_C from the func_C, a loop is formed in the func_C. That is, the result is a world of just the func_C. In such a state, no matter what event occurs, the func_C will always be called, it becomes possible to change the definitions of the mouse, and it becomes possible to change the definitions of the mouse buttons from "left: movement", "middle: deletion", "right: copying" to "left: confirmation of processing", "middle: cancellation of processing", and "right: change of mode of processing".

FIG. 37 is a view showing an example of the flow of processing of the function C in FIG. 36. For example, in the case of executing "movement" of a line as mentioned above, by combination with the flow of processing shown in FIG. 37, it becomes possible to freely change the "change of mode of processing" command" even during execution of a "movement" command. The <1>, <2>, <3>, and <4> in the figure show expansion of the range of application of the line to be moved from 1 to 4.

As explained above, according to the present invention, by assigning new command functions to buttons of a pointing device, for example, a mouse, it is possible to instruct movement, deletion, copying, and other editing of a pattern (element) by just operation of buttons and thereby to improve the efficiency of work in pattern design.

Further, separate command functions may be assigned to the buttons after the above editing instructions and, for example, confirmation, cancellation, change, etc. of the mode of processing performed by just operation of the buttons.

The buttons may be further assigned the functions of addition or subtraction of a polygon to or from another polygon, thereby enabling a generation of a graphic of a complicated shape by simple mouse operation.

What is claimed is:

1. An editor in CAD system having a pointing device provided with a plurality of pointing buttons used to operate a cursor on a display for pattern design of a printed circuit board, said editor comprising:

an editor main loop unit for governing an overall management of various types of events which occur during editing;

operation discrimination processing means for, when receiving from said editor main loop unit a command instructing the editing of an N-gonal (where N is three or more) graphic on the display, recognizing which button among the plurality of buttons has been operated, recognizing a designation of the cursor and discriminating whether processing for adding a graphic or processing for subtracting the graphic should be performed in accordance with a type of the button which is operated;

coordinate fetching means for fetching coordinates of an editing graphic and specifying an overall shape of the editing graphic based on the designation of the cursor;

graphic computing means for receiving an instruction output from said operation discrimination processing means to perform addition processing or subtraction processing, receiving information regarding the overall shape of the editing graphic from said coordinate fetching means, and editing the N-gonal graphic on the display by adding the editing graphic to or subtracting the editing graphic from the N-gonal graphic on the display;; and graphic registering means for registering the N-gonal graphic edited by said graphic computing means in a memory area of said editor main loop unit.

2. An editor as set forth in claim 1, wherein said coordinate fetching means includes a rectangular coordinate fetching unit receiving as input a starting point and an end point of a path of movement of the cursor as information on a diagonal and specifying the editing graphic as a rectangle defined by the diagonal, and salient point coordinate fetching means for specifying the editing graphic by a group of salient point coordinates input for salient points by the cursor.

* * * * *